United States Patent
Mountain

(10) Patent No.: US 9,681,176 B2
(45) Date of Patent: Jun. 13, 2017

(54) PROVISIONING PREFERRED MEDIA CONTENT

(71) Applicant: ECHOSTAR UK HOLDINGS LIMITED, Keighley, West Yorkshire (GB)

(72) Inventor: Dale Llewelyn Mountain, Keighley (GB)

(73) Assignee: EchoStar Technologies L.L.C., Englewood, CO (US)

(*) Notice: Subject to any disclaimer, the term of this patent is extended or adjusted under 35 U.S.C. 154(b) by 0 days.

(21) Appl. No.: 14/470,279

(22) Filed: Aug. 27, 2014

(65) Prior Publication Data

US 2016/0066026 A1    Mar. 3, 2016

(51) Int. Cl.
| | | |
|---|---|---|
| G06F 3/00 | (2006.01) | |
| G06F 13/00 | (2006.01) | |
| H04N 5/445 | (2011.01) | |
| H04N 21/433 | (2011.01) | |
| H04N 21/426 | (2011.01) | |
| H04N 21/45 | (2011.01) | |
| H04N 21/458 | (2011.01) | |
| H04N 21/466 | (2011.01) | |
| H04N 21/482 | (2011.01) | |
| H04N 21/61 | (2011.01) | |
| H04N 5/775 | (2006.01) | |

(52) U.S. Cl.
CPC ......... *H04N 21/4334* (2013.01); *H04N 5/775* (2013.01); *H04N 21/4263* (2013.01); *H04N 21/4331* (2013.01); *H04N 21/4532* (2013.01); *H04N 21/4583* (2013.01); *H04N 21/4667* (2013.01); *H04N 21/4668* (2013.01); *H04N 21/4826* (2013.01); *H04N 21/6143* (2013.01)

(58) Field of Classification Search
CPC combination set(s) only.
See application file for complete search history.

(56) References Cited

U.S. PATENT DOCUMENTS

| | | |
|---|---|---|
| 6,005,562 A | 12/1999 | Shiga et al. |
| 6,177,931 B1 | 1/2001 | Alexander et al. |
| 6,681,396 B1 | 1/2004 | Bates et al. |
| 7,174,512 B2 | 2/2007 | Martin et al. |
| 7,197,715 B1 | 3/2007 | Valeria |
| 7,633,887 B2 | 12/2009 | Panwar et al. |
| 7,680,894 B2 | 3/2010 | Diot et al. |

(Continued)

FOREIGN PATENT DOCUMENTS

| | | |
|---|---|---|
| EP | 1 865 716 A2 | 12/2007 |
| EP | 2 309 733 B1 | 4/2011 |

(Continued)

OTHER PUBLICATIONS

Extended European Search Report for EP 14160140.1 received Jul. 7, 2014, 7 pages.

(Continued)

*Primary Examiner* — Brian T Pendleton
*Assistant Examiner* — Alexander Gee
(74) *Attorney, Agent, or Firm* — Kilpatrick Townsend & Stockton LLP

(57) ABSTRACT

Allocating idle tuner resources to buffer or record broadcast programming determined to be desirable or preferred by any particular user or television viewer.

20 Claims, 7 Drawing Sheets

(56) References Cited

U.S. PATENT DOCUMENTS

| | | |
|---|---|---|
| 7,774,811 B2 | 8/2010 | Poslinski et al. |
| 7,818,368 B2 | 10/2010 | Yang et al. |
| 7,825,989 B1 | 11/2010 | Greenberg |
| 7,849,487 B1 | 12/2010 | Vosseller |
| 8,046,798 B1 | 10/2011 | Schlack et al. |
| 8,079,052 B2 | 12/2011 | Chen et al. |
| 8,104,065 B2 | 1/2012 | Aaby et al. |
| 8,209,713 B1 | 6/2012 | Lai et al. |
| 8,296,797 B2 | 10/2012 | Olstad et al. |
| 8,312,486 B1 | 11/2012 | Briggs et al. |
| 8,424,041 B2 | 4/2013 | Candelore et al. |
| 8,427,356 B1* | 4/2013 | Satish .............. H04N 21/44204 341/176 |
| 8,627,349 B2 | 1/2014 | Kirby et al. |
| 8,689,258 B2 | 4/2014 | Kemp |
| 8,752,084 B1 | 6/2014 | Lai et al. |
| 8,973,038 B2 | 3/2015 | Gratton |
| 8,973,068 B2 | 3/2015 | Kotecha et al. |
| 8,990,418 B1 | 3/2015 | Bragg et al. |
| 9,038,127 B2 | 5/2015 | Hastings et al. |
| 9,066,156 B2 | 6/2015 | Kapa |
| 9,213,986 B1 | 12/2015 | Buchheit et al. |
| 9,253,533 B1 | 2/2016 | Morgan et al. |
| 9,264,779 B2 | 2/2016 | Kirby et al. |
| 9,420,333 B2 | 8/2016 | Martch et al. |
| 2001/0013123 A1 | 8/2001 | Freeman et al. |
| 2001/0026609 A1 | 10/2001 | Weinstein et al. |
| 2002/0059610 A1 | 5/2002 | Ellis |
| 2002/0067376 A1 | 6/2002 | Martin et al. |
| 2002/0075402 A1 | 6/2002 | Robson et al. |
| 2002/0174430 A1 | 11/2002 | Ellis et al. |
| 2002/0178444 A1 | 11/2002 | Trajkovic et al. |
| 2003/0023742 A1 | 1/2003 | Allen et al. |
| 2003/0056220 A1 | 3/2003 | Thornton et al. |
| 2003/0066077 A1 | 4/2003 | Gutta et al. |
| 2003/0118014 A1 | 6/2003 | Iyer et al. |
| 2003/0126605 A1 | 7/2003 | Betz et al. |
| 2003/0126606 A1 | 7/2003 | Buczak et al. |
| 2003/0188317 A1 | 10/2003 | Liew et al. |
| 2003/0189674 A1 | 10/2003 | Inoue et al. |
| 2003/0208763 A1 | 11/2003 | McElhatten et al. |
| 2003/0229899 A1 | 12/2003 | Thompson et al. |
| 2004/0181807 A1 | 9/2004 | Theiste et al. |
| 2005/0030977 A1 | 2/2005 | Casey et al. |
| 2005/0044570 A1 | 2/2005 | Poslinski |
| 2005/0071865 A1 | 3/2005 | Martins |
| 2005/0125302 A1 | 6/2005 | Brown et al. |
| 2005/0152565 A1 | 7/2005 | Jouppi et al. |
| 2005/0166230 A1 | 7/2005 | Gaydou et al. |
| 2005/0180568 A1 | 8/2005 | Krause |
| 2005/0191041 A1 | 9/2005 | Braun et al. |
| 2005/0240961 A1 | 10/2005 | Jerding et al. |
| 2005/0264705 A1 | 12/2005 | Kitamura |
| 2006/0020962 A1 | 1/2006 | Stark et al. |
| 2006/0174277 A1 | 8/2006 | Sezan et al. |
| 2006/0190615 A1 | 8/2006 | Panwar et al. |
| 2006/0238656 A1 | 10/2006 | Chen et al. |
| 2006/0253581 A1 | 11/2006 | Dixon et al. |
| 2006/0282852 A1 | 12/2006 | Purpura et al. |
| 2006/0282869 A1 | 12/2006 | Plourde, Jr. |
| 2007/0033616 A1 | 2/2007 | Gutta |
| 2007/0058930 A1* | 3/2007 | Iwamoto ............... H04N 5/782 386/297 |
| 2007/0083901 A1 | 4/2007 | Bond |
| 2007/0127894 A1 | 6/2007 | Ando et al. |
| 2007/0146554 A1 | 6/2007 | Strickland et al. |
| 2007/0154163 A1 | 7/2007 | Cordray |
| 2007/0154169 A1 | 7/2007 | Cordray et al. |
| 2007/0157235 A1 | 7/2007 | Teunissen |
| 2007/0157249 A1 | 7/2007 | Cordray et al. |
| 2007/0157253 A1 | 7/2007 | Ellis et al. |
| 2007/0188655 A1 | 8/2007 | Ohta |
| 2007/0199040 A1* | 8/2007 | Kates ..................... H04N 5/76 725/134 |
| 2007/0204302 A1 | 8/2007 | Calzone |
| 2007/0226766 A1 | 9/2007 | Poslinski et al. |
| 2007/0245379 A1 | 10/2007 | Agnihortri |
| 2008/0022012 A1 | 1/2008 | Wang |
| 2008/0060006 A1 | 3/2008 | Shanks et al. |
| 2008/0086743 A1 | 4/2008 | Cheng et al. |
| 2008/0097949 A1 | 4/2008 | Kelly et al. |
| 2008/0109307 A1 | 5/2008 | Ullah |
| 2008/0134043 A1 | 6/2008 | Georgis et al. |
| 2008/0163305 A1 | 7/2008 | Johnson et al. |
| 2008/0195457 A1 | 8/2008 | Sherman et al. |
| 2008/0235348 A1 | 9/2008 | Dasgupta |
| 2008/0239169 A1 | 10/2008 | Moon et al. |
| 2008/0300982 A1 | 12/2008 | Larson et al. |
| 2008/0320523 A1 | 12/2008 | Morris et al. |
| 2009/0044217 A1 | 2/2009 | Lutterbach et al. |
| 2009/0055385 A1 | 2/2009 | Jeon et al. |
| 2009/0102984 A1 | 4/2009 | Arling et al. |
| 2009/0138902 A1 | 5/2009 | Kamen |
| 2009/0178071 A1 | 7/2009 | Whitehead |
| 2009/0234828 A1 | 9/2009 | Tu |
| 2009/0249412 A1 | 10/2009 | Bhogal et al. |
| 2009/0293093 A1 | 11/2009 | Igarashi |
| 2009/0299824 A1 | 12/2009 | Barnes, Jr. |
| 2009/0325523 A1 | 12/2009 | Choi |
| 2010/0040151 A1 | 2/2010 | Garrett |
| 2010/0071007 A1 | 3/2010 | Meijer |
| 2010/0071062 A1 | 3/2010 | Choyi et al. |
| 2010/0089996 A1 | 4/2010 | Koplar |
| 2010/0115554 A1 | 5/2010 | Drouet et al. |
| 2010/0122294 A1 | 5/2010 | Craner |
| 2010/0146560 A1 | 6/2010 | Bonfrer |
| 2010/0153983 A1 | 6/2010 | Phillmon et al. |
| 2010/0153999 A1 | 6/2010 | Yates |
| 2010/0158479 A1 | 6/2010 | Craner |
| 2010/0166389 A1 | 7/2010 | Knee et al. |
| 2010/0169925 A1 | 7/2010 | Takegoshi |
| 2010/0218214 A1 | 8/2010 | Fan et al. |
| 2010/0251295 A1 | 9/2010 | Amento et al. |
| 2010/0262986 A1 | 10/2010 | Adimatyam et al. |
| 2010/0269144 A1 | 10/2010 | Forsman et al. |
| 2010/0319019 A1 | 12/2010 | Zazza |
| 2010/0322592 A1 | 12/2010 | Casagrande |
| 2010/0333131 A1 | 12/2010 | Parker et al. |
| 2011/0016492 A1 | 1/2011 | Morita |
| 2011/0019839 A1 | 1/2011 | Nandury |
| 2011/0052156 A1 | 3/2011 | Kuhn |
| 2011/0072448 A1 | 3/2011 | Stiers et al. |
| 2011/0109801 A1 | 5/2011 | Thomas et al. |
| 2011/0202956 A1 | 8/2011 | Connelly et al. |
| 2011/0206342 A1 | 8/2011 | Thompson et al. |
| 2011/0239249 A1 | 9/2011 | Murison et al. |
| 2011/0243533 A1 | 10/2011 | Stern et al. |
| 2011/0252451 A1 | 10/2011 | Turgeman et al. |
| 2011/0286721 A1 | 11/2011 | Craner |
| 2011/0289410 A1 | 11/2011 | Paczkowski et al. |
| 2011/0293113 A1 | 12/2011 | McCarthy |
| 2012/0020641 A1 | 1/2012 | Sakaniwa et al. |
| 2012/0052941 A1 | 3/2012 | Mo |
| 2012/0060178 A1 | 3/2012 | Minakuchi et al. |
| 2012/0106932 A1 | 5/2012 | Grevers, Jr. |
| 2012/0131613 A1 | 5/2012 | Ellis et al. |
| 2012/0185895 A1 | 7/2012 | Wong et al. |
| 2012/0204209 A1 | 8/2012 | Kubo |
| 2012/0230651 A1 | 9/2012 | Chen |
| 2012/0246672 A1 | 9/2012 | Sridhar et al. |
| 2012/0278837 A1 | 11/2012 | Curtis et al. |
| 2012/0311633 A1 | 12/2012 | Mandrekar et al. |
| 2013/0014159 A1 | 1/2013 | Wiser et al. |
| 2013/0055304 A1* | 2/2013 | Kirby ................ H04N 21/2365 725/31 |
| 2013/0061313 A1 | 3/2013 | Cullimore et al. |
| 2013/0074109 A1* | 3/2013 | Skelton .................. H04H 20/00 725/14 |
| 2013/0114940 A1 | 5/2013 | Merzon et al. |
| 2013/0128119 A1 | 5/2013 | Madathodiyil et al. |
| 2013/0145023 A1 | 6/2013 | Li et al. |
| 2013/0174196 A1 | 7/2013 | Herlein |
| 2013/0194503 A1 | 8/2013 | Yamashita |
| 2013/0263189 A1 | 10/2013 | Garner |

(56) References Cited

U.S. PATENT DOCUMENTS

| | | | |
|---|---|---|---|
| 2013/0283162 A1 | 10/2013 | Aronsson et al. | |
| 2013/0298151 A1 | 11/2013 | Leske et al. | |
| 2013/0332962 A1* | 12/2013 | Moritz | H04N 21/2407 725/46 |
| 2013/0346302 A1 | 12/2013 | Purves et al. | |
| 2014/0032709 A1 | 1/2014 | Saussy et al. | |
| 2014/0068675 A1 | 3/2014 | Mountain | |
| 2014/0123160 A1 | 5/2014 | van Coppenolle et al. | |
| 2014/0139555 A1 | 5/2014 | Levy | |
| 2014/0140680 A1 | 5/2014 | Jo | |
| 2014/0153904 A1* | 6/2014 | Adimatyam | H04N 5/76 386/248 |
| 2014/0157327 A1 | 6/2014 | Roberts et al. | |
| 2014/0215539 A1 | 7/2014 | Chen et al. | |
| 2014/0282714 A1 | 9/2014 | Hussain | |
| 2014/0282741 A1* | 9/2014 | Shoykhet | H04N 21/47214 725/58 |
| 2014/0282745 A1 | 9/2014 | Chipman et al. | |
| 2014/0282759 A1 | 9/2014 | Harvey et al. | |
| 2014/0294201 A1 | 10/2014 | Johnson et al. | |
| 2014/0310819 A1 | 10/2014 | Cakarel et al. | |
| 2014/0313341 A1 | 10/2014 | Stribling | |
| 2014/0325556 A1 | 10/2014 | Hoang et al. | |
| 2014/0331260 A1 | 11/2014 | Gratton | |
| 2014/0333841 A1 | 11/2014 | Steck | |
| 2014/0351045 A1 | 11/2014 | Abihssira et al. | |
| 2014/0373079 A1 | 12/2014 | Friedrich et al. | |
| 2015/0003814 A1* | 1/2015 | Miller | H04N 21/4583 386/297 |
| 2015/0020097 A1 | 1/2015 | Freed et al. | |
| 2015/0040176 A1 | 2/2015 | Hybertson et al. | |
| 2015/0058890 A1 | 2/2015 | Kapa | |
| 2015/0095932 A1 | 4/2015 | Ren | |
| 2015/0118992 A1 | 4/2015 | Wyatt et al. | |
| 2015/0181132 A1 | 6/2015 | Kummer et al. | |
| 2015/0181279 A1 | 6/2015 | Martch et al. | |
| 2015/0249803 A1* | 9/2015 | Tozer | H04N 21/4334 386/293 |
| 2015/0249864 A1 | 9/2015 | Tang et al. | |
| 2015/0310725 A1 | 10/2015 | Koskan et al. | |
| 2015/0334461 A1* | 11/2015 | Yu | H04N 21/4668 725/14 |
| 2016/0066020 A1 | 3/2016 | Mountain | |
| 2016/0066049 A1 | 3/2016 | Mountain | |
| 2016/0066056 A1 | 3/2016 | Mountain | |
| 2016/0073172 A1 | 3/2016 | Sharples | |
| 2016/0088351 A1 | 3/2016 | Petruzzelli et al. | |
| 2016/0191147 A1 | 6/2016 | Martch | |
| 2016/0198229 A1 | 7/2016 | Keipert | |
| 2016/0309212 A1 | 10/2016 | Martch et al. | |

FOREIGN PATENT DOCUMENTS

| | | |
|---|---|---|
| EP | 2 403 239 A1 | 1/2012 |
| FR | 2 902 568 A1 | 12/2007 |
| JP | H10 322622 A | 12/1998 |
| JP | 2006-245745 A | 9/2006 |
| KR | 2004 0025073 A | 3/2004 |
| KR | 2006 0128295 A | 12/2006 |
| WO | 98/37694 A1 | 8/1998 |
| WO | 2005/059807 A2 | 6/2005 |
| WO | 2007/064987 A2 | 6/2007 |
| WO | 2007/098067 A1 | 8/2007 |
| WO | 2009/073925 A1 | 6/2009 |
| WO | 2013/016626 A1 | 1/2013 |
| WO | 2014/072742 A1 | 5/2014 |
| WO | 2014/179017 A1 | 11/2014 |
| WO | 2016/030384 | 3/2016 |
| WO | 2016/030477 A1 | 3/2016 |
| WO | 2016/034899 A1 | 3/2016 |
| WO | 2016/055761 A1 | 4/2016 |

OTHER PUBLICATIONS

Extended European Search Report for EP 11166892.7 dated Oct. 6, 2011, 7 pages.
International Search Report and Written Opinion of PCT/US2014/033796 mailed Sep. 5, 2014, 12 pages.
U.S. Appl. No. 13/919,702, filed Jun. 17, 2013 Non Final Office Action mailed Jun. 11, 2014, 25 pages.
U.S. Appl. No. 13/942,451, filed Jun. 15, 2013 Non Final Office Action mailed Jul. 28, 2014, 27 pages.
U.S. Appl. No. 13/971,579, filed Aug. 20, 2013 Non Final Office Action mailed Oct. 28, 2014, 35 pages.
Jin S H et al., "Intelligent broadcasting system and services for personalized semantic contents consumption", Expert Systems With Applications, Oxford, GB, vol. 31, No. 1, Jul. 1, 2006, pp. 164-173, XP024962718, ISSN: 0957-4174, DOI: 10.1016/J.ESWA.2005.09. 021.
Sung Ho Jin et al., "Real-time content filtering for live broadcasts in TV terminals", Multimedia Tools and Applications, Kluwer Academic Publishers, BO, vol. 36, No. 3, Jun. 29, 2007 pp. 285-301, XP019578768, ISSN: 1573-7721.
European Search Report for EP 14197940.1 mailed Apr. 28, 2015, 13 pages.
U.S. Appl. No. 14/139,420, filed Dec. 23, 2013 Non-Final Office Action mailed Apr. 30, 2015, 27 pages.
U.S. Appl. No. 14/095,860, filed Dec. 3, 2013 Final Office Action mailed May 1, 2015, 18 pages.
U.S. Appl. No. 14/071,613, filed Nov. 4, 2013 Non-Final Office Action mailed May 18, 2015, 20 pages.
U.S. Appl. No. 13/971,579, filed Aug. 20, 2013 Notice of Allowance mailed Feb. 27, 2015, 28 pages.
U.S. Appl. No. 13/942,451, filed Jul. 15, 2013 Final Office Action mailed Apr. 30, 2015, 33 pages.
U.S. Appl. No. 13/919,702, filed Jun. 17, 2013 Non-Final Office Action mailed Apr. 30, 2015, 26 pages.
U.S. Appl. No. 14/200,864, filed Mar. 7, 2014 Final Office Action mailed Jun. 18, 2015, 36 pages.
U.S. Appl. No. 14/095,860, filed Dec. 3, 2013 Notice of Allowance mailed Jul. 13, 2015, 31 pages.
U.S. Appl. No. 14/200,864, filed Mar. 7, 2014, Non-Final Office Action mailed Dec. 5, 2014, 35 pages.
U.S. Appl. No. 14/095,860, filed Dec. 3, 2013 Non-Final Office Action mailed Dec. 26, 2014, 45 pages.
U.S. Appl. No. 13/886,873, filed May 3, 2013, Notice of Allowance mailed Oct. 24, 2014, 40 pages.
U.S. Appl. No. 13/919,702, filed Jun. 17, 2013 Final Office Action mailed Nov. 18, 2014, 24 pages.
U.S. Appl. No. 14/470,248, filed Aug. 27, 2014, Preinterview first office action mailed Sep. 4, 2015, 22 pages.
U.S. Appl. No. 14/479,007, filed Sep. 5, 2014, Non-Final Office Action mailed Sep. 1, 2015, 44 pages.
U.S. Appl. No. 14/139,299, filed Dec. 23, 2013 Non Final Office Action mailed Aug. 14, 2015, 39 pages.
Office Action for EP 14160140.1 mailed Jan. 19, 2016, 5 pages.
International Search Report and Written Opinion for PCT/GB2015/052570 mailed Dec. 11, 2015, 13 pages.
U.S. Appl. No. 14/200,864, filed Mar. 7, 2014 Non-Final Office Action mailed Feb. 18, 2016, 61 pages.
U.S. Appl. No. 14/479,007, filed Sep. 5, 2014, Final Office Action mailed Feb. 22, 2016, 37 pages.
U.S. Appl. No. 14/139,299, filed Dec. 23, 2013, Final Office Action mailed Feb. 25, 2016, all pages.
U.S. Appl. No. 14/139,420, filed Dec. 23, 2013 Notice of Allowance mailed Mar. 31, 2016, 37 pages.
U.S. Appl. No. 14/470,392, filed Aug. 27, 2014 Final Office Action mailed Mar. 4, 2016, all pages.
U.S. Appl. No. 14/470,415, filed Aug. 27, 2014 Final Office Action mailed Mar. 3, 2016, all pages.
International Search Report and Written Opinion for PCT/EP2015/069461 mailed Oct. 1, 2015, 13 pages.
International Search Report and Written Opinion for PCT/EP2015/069456 mailed Oct. 5, 2015, all pages.
International Preliminary Report on Patentability for PCT/US2014/033796 issued Nov. 3, 2015, all pages.

(56) References Cited

OTHER PUBLICATIONS

International Search Report and Written Opinion for PCT/EP2015/069681 mailed Nov. 23, 2015, 12 pages.
U.S. Appl. No. 14/095,860, filed Dec. 3, 2013 Notice of Allowance mailed Oct. 19, 2015, 14 pages.
U.S. Appl. No. 13/919,702, filed Jun. 17, 2013 Final Office Action mailed Dec. 31, 2015, 30 pages.
U.S. Appl. No. 14/071,613, filed Nov. 4, 2013 Final Office Action mailed Oct. 8, 2015, 11 pages.
U.S. Appl. No. 14/470,392, filed Aug. 27, 2014 Non Final Office Action mailed Nov. 5, 2015, 31 pages.
U.S. Appl. No. 14/470,415, filed Aug. 27, 2014 Non Final Office Action mailed Nov. 18, 2015, 28 pages.
U.S. Appl. No. 13/942,451, filed Jul. 15, 2013 Non Final Office Action mailed Jan. 8, 2016, 41 pages.
U.S. Appl. No. 14/591,474, filed Jan. 7, 2015, Non-Final Office Action mailed Feb. 12, 2016, 32 pages.
U.S. Appl. No. 14/494,079, filed Sep. 23, 2014, Preinterview first office action mailed Feb. 10, 2016, 6 pages.
U.S. Appl. No. 14/470,248, filed Aug. 27, 2014, Final Office Action mailed Feb. 16, 2016, 26 pages.
International Search Report and Written Opinion for PCT/GB2015/052456 mailed Jun. 13, 2016, all pages.
U.S. Appl. No. 14/470,248, filed Aug. 27, 2014, Non Final Office Action mailed Jul. 25, 2016, all pages.
U.S. Appl. No. 14/479,007, filed Sep. 5, 2014, Non-Final Office Action mailed Jul. 27, 2016, 37 pages.
U.S. Appl. No. 13/942,451, filed Jul. 15, 2013 Final Office Action mailed Jun. 22, 2016, all pages.
U.S. Appl. No. 13/919,702, filed Jun. 17, 2013 Non Final Office Action mailed Jun. 30, 2016, all pages.
U.S. Appl. No. 14/139,299, filed Dec. 23, 2013, Non Final Office Action mailed Jun. 20, 2016, all pages.
U.S. Appl. No. 14/470,392, filed Aug. 27, 2014 Non-Final Office Action mailed Aug. 5, 2016, all pages.
U.S. Appl. No. 14/470,415, filed Aug. 27, 2014 Non Final Office Action mailed Jul. 29, 2016, all pages.
U.S. Appl. No. 14/200,864, filed Mar. 7, 2014 Notice of Allowance mailed Sep. 15, 2016, all pages.
U.S. Appl. No. 15/195,527, filed Jun. 28, 2016, Non-Final Rejection mailed Sep. 30, 2016, all pages.
U.S. Appl. No. 13/942,451, filed Jul. 15, 2013 Non Final Office Action mailed Oct. 25, 2016, all pages.
U.S. Appl. No. 13/919,702, filed Jun. 17, 2013 Final Office Action mailed Oct. 28, 2016, all pages.

\* cited by examiner

PROVISIONING PREFERRED MEDIA CONTENT

BACKGROUND

The advent of the digital video recorder and the availability of high-capacity and affordable computer-readable storage devices have made available many possibilities to television programming service providers and viewers alike. In addition, television viewers have come to expect flexibility and convenience with respect to the recording and/or accessing of content via their television receivers.

SUMMARY

In an aspect, a method may include or comprise identifying a particular tuner of a multi-tuner television receiver, wherein the particular tuner is designated as in an idle mode. The method may further include or comprise accessing a listing that itemizes a plurality of television channels to be recorded by the television receiver for an indeterminate time period. The method may further include or comprise recording at least one television channel of the plurality of television channels using the particular tuner while the particular tuner is designated as in the idle mode.

In an aspect, a television receiver may include or comprise one or more processors, a plurality of tuners, and a memory communicatively coupled with and readable by the one or more processors and having stored therein processor-readable instructions. The processor-readable instructions may when executed by the one or more processors, cause the one or more processors to identify a particular tuner of the plurality of tuners that is in an idle mode. The processor-readable instructions may when executed by the one or more processors, cause the one or more processors to access a listing that itemizes a plurality of television channels to be recorded by the television receiver for an indeterminate time period. The processor-readable instructions may when executed by the one or more processors, cause the one or more processors to record at least one television channel of the plurality of television channels using the particular tuner while the particular tuner is designated as in the idle mode.

In an aspect, a method may include or comprise identifying a particular tuner of a multi-tuner television receiver, wherein the particular tuner is designated as in an idle mode. The may further include or comprise accessing, in response to the identifying, a listing that itemizes a plurality of television channels to be recorded by the television receiver for an indeterminate time period, wherein the listing itemizes a plurality of channels favored by a particular end-user and is at least one of manually populated and automatically populated without end-user input. The method may further include or comprise selecting at least one television channel from the listing based upon a priority scheme that identifies the at least one television channel as preferred over other television channels of the plurality of television channels. The may further include or comprise recording at least one television channel of the plurality of television channels using the particular tuner. The method may further include or comprise determining a change in status of the particular tuner from the idle mode to an active mode. The may further include or comprise discontinuing recording of the at least one television channel in response to determining the change in status.

DETAILED DESCRIPTION

Figure 1:
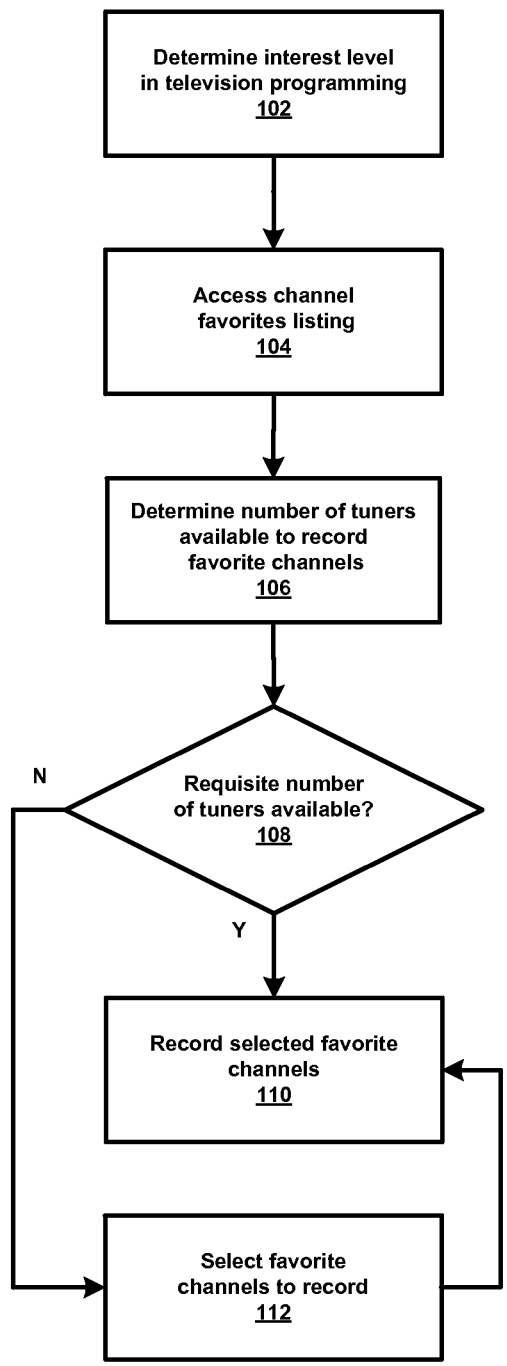
FIG. 1 shows a first example method in accordance with the disclosure.

The present disclosure is directed to or towards systems and methods for provisioning preferred media content. The media content may be considered "preferred" because such content may be selectively recorded based upon user preferences that may be determined through or from direct or manual user input and/or through or from an automated process or algorithm that leverages historical or empirical usage data. Example types of media may include advertising media, broadcast media, social media, news media, and the like. Accordingly, the principles of the present disclosure may be applicable in or to many different types of scenarios.

For example, in a satellite television implementation it is not uncommon for one or more tuners of a multi-tuner television receiver to be idle at any given time. In this example, any particular idle tuner might normally be left unused until that particular tuner is called upon to provide access to live broadcast programming, to record particular broadcast programming based on activation of a recording timer, and etc. Such mismanagement or underutilization of television receiver resources is an undesirable but generally unavoidable consequence of typical satellite television systems. The various features or aspects of the present disclosure address this and other issues associated with a satellite television implementation by virtue of providing a service that intelligently allocates idle tuner resources to buffer or record broadcast programming determined to be desirable or preferred by any particular user or television viewer. Such features or aspects may be beneficial and/or advantageous in many respects.

For example, it is contemplated that the features or aspects of the present disclosure may, among other things, serve to entice new customers to subscribe to services as offered by a particular satellite television provider, as well as provide an incentive for existing customers to maintain their loyalty and/or relationship with the particular satellite television provider. Although not so limited, an appreciation of the various aspects of the present disclosure may be gained from the following discussion in connection with the drawings. For instance, referring now to FIG. 1, a first example method 100 is shown in accordance with the disclosure.

At step 102, a television receiver may determine or evaluate interest level in broadcast programming associated with a particular television channel that is currently output by the television receiver for display by a presentation device. For example, the television receiver may initially detect a "channeling-up" action from a first television channel to a second different television channel, consistent with "channel-surfing" commonly performed by television viewers during a commercial break, for example. In this example, the television receiver may detect that the second television channel has been output to a television for display thereon for a time period equal to or exceeding a predetermined and user-configurable threshold, such as about 1 minute, about 2 minutes, about 2.5 minutes, about 5 minutes, etc., and then may make a determination that a viewer is very likely interested in the programming currently associated with the second television channel. In this manner, the television receiver may determine or evaluate interest level in programming based on the amount of time that particular programming is output by the television receiver to a presentation device. Other examples are possible.

For example, the television receiver may immediately, or approximately instantaneously, determine that a viewer is very likely interested in the programming currently associated with the second television channel when the second television channel is listed within a "favorites" listing as managed or maintained by the television receiver. For example, a particular user or viewer may provide a manual input or command that is detected by the television receiver indicating that Channel 1 is a favorite channel, and that certain actions may be performed by the television receiver when that channel is switched-to or tuned-to during a channeling event, such as a channeling-up event, a channeling-down event, a "recall" channeling event, etc. In this example, and among other things, the television receiver may immediately determine that a viewer is very likely interested in the programming currently associated with the second television channel, assuming that the second television channel is Channel 1 and is or has been entered as a favorite channel in a favorites listing as discussed within the context of the example method 100.

At step 104, the television receiver may access a favorites listing maintained and/or managed by the television receiver. In general, a favorites listing may be associated with a particular customer account, and may include one or entries that specify or otherwise define particular television channels that are of particular or preferred interest. An example favorites listing may include four (4) entries specifying Channels 1-4 as favorite television channels. Many other examples are possible, and it is contemplated that any particular favorites listing defined or otherwise populated in the context of the present disclosure has at least one entry that specifies a particular television channel of interest. It is further contemplated that any of the one or more entries of the favorites listing may be inserted by a manual or automatic operation. An example of a manual operation includes a user or viewer manually defining via graphical user interface Channel 1 as a favorite channel. An example of an automatic operation includes a particular television receiver monitoring usage and implementing an algorithm that identifies Channel 2 as a favorite channel, based on historical or empirical data.

It is further contemplated that a priority scheme may be employed so that some television channels may be determined to be preferred over other television channels within the favorites listing. The priority "value" may be manually defined or otherwise automatically defined, similar to the above-mentioned favorites listing or list population mechanism. For example, a particular viewer or user may via graphical user interface manually define a priority scheme as: Priority 1, Channel 2; Priority 2, Channel 1; Priority 3, Channel 4; Priority 4, Channel 3. In another example, a television receiver may automatically define a priority scheme based on historical usage information as: Priority 1, Channel 1; Priority 2, Channel 2; Priority 3, Channel 3; Priority 4, Channel 4. Still many other examples are possible. For example, a hybrid priority scheme may be defined whereby a particular viewer or user may via graphical user interface manually define Channel 3 as Priority 1, and then a television receiver may automatically define Channel 4 as Priority 2, and Channel 2 as Priority 3, and Channel 1 as Priority 4 so that the following priority scheme is defined: Priority 1, Channel 3; Priority 2, Channel 4; Priority 3, Channel 2; Priority 4, Channel 1.

At step 106, the television receiver may determine or evaluate a number of tuners available to record television channels that are listed in or within the favorites listing as accessed by the television receiver at step 104. For example, the television receiver may have previously determined that a particular favorites listing contains the following entries: Priority 1, Channel 2; Priority 2, Channel 1; Priority 3, Channel 4; Priority 4, Channel 3. Further, the television receiver may determine or identify a particular television channel that is currently being recorded or output by the television receiver for display by a presentation device, such as Channel 5 for example. In this example, it is assumed that the television receiver is a three (3) tuner receiver, and that each of the Channels 1-5 do not reside on a same satellite transponder frequency. For example, it may be assumed for simplicity that Channel 1 resides on a particular satellite transponder 1, Channel 2 resides on a particular satellite transponder 2, Channel 3 resides on a particular satellite transponder 3, Channel 4 resides on a particular satellite transponder 4, and Channel 5 resides on a particular satellite transponder 5. Other examples are possible.

In the present example though, a particular tuner of the 3-tuner television receiver may be allocated to receive Channel 5, so that the television receiver may tune-to, decode, and ultimately output for display by a presentation device programming associated with Channel 5. Accordingly, the television receiver may determine or evaluate that there are two (2) tuners available to record television channels listed in the favorites listing as accessed by the television receiver at step 104. In a scenario such as in the present example, where the number of available tuners is less than a total number of entries within the favorites listing, the television receiver may triage and select only the most preferred television channels to record for later viewing. In a scenario where the number of available tuners is greater than or equal a total number of entries within the favorites listing, the television receiver may select each of television channels to record for later viewing.

For example, at step 108, the television receiver may determine whether the number of available tuners is less than, or greater than or equal to, a total number of entries within the favorites listing as accessed at step 104. When the television receiver determines that a number of available tuners is greater than or equal to a total number of entries within the favorites listing, process flow within the method 100 may branch to step 110. At step 110, the television receiver may allocate a particular number of tuners to record each of the television channels listed within the favorites listing as accessed at step 104. For example, the television receiver may have previously determined that a particular favorites listing contains the following entries: Priority 1, Channel 1; Priority 2, Channel 2, and that a particular television channel that is currently output by the television receiver for display by a presentation device is Channel 3 for example. In a three (3) tuner implementation, and assuming that Channels 1-3 do not reside on a same satellite transponder frequency, a particular tuner may be allocated to each one of the Channels 1-3, so that the television receiver may tune-to, decode, and ultimately output for display by a presentation device programming associated with each of the Channels 1-3 as or when desired. Other examples are possible.

For example, when the television receiver determines that a number of available tuners is less than a total number of entries within the favorites listing as accessed at step 104, process flow within the example method 100 may branch to step 112. At step 112, the television receiver may identify a priority scheme within the favorites listing so that the television receiver may select the "most preferred" television channels to record. For example, the television receiver may have previously determined that a particular favorites listing contains the following entries: Priority 1, Channel 1; Priority 2, Channel 2; Priority 3, Channel 3. Further, the television receiver may determine a particular television channel that is currently output by the television receiver for display by a presentation device is Channel 4 for example. In a three (3) tuner implementation, and assuming that Channels 1-4 do not reside on a same satellite transponder frequency, a particular tuner may be allocated to each one of the Channels 1-2 and 4, so that the television receiver may tune-to, decode, and ultimately output for display by a presentation device broadcast programming associated with each of the 1-2 and 4 as or when desired. This is captured in the method 100 by a branch from step 112 back to step 110. Other examples are possible. Further scenarios and beneficial aspects associated with provisioning preferred media content are described in detail below in connection with FIGS. 2-7.

Figure 2:
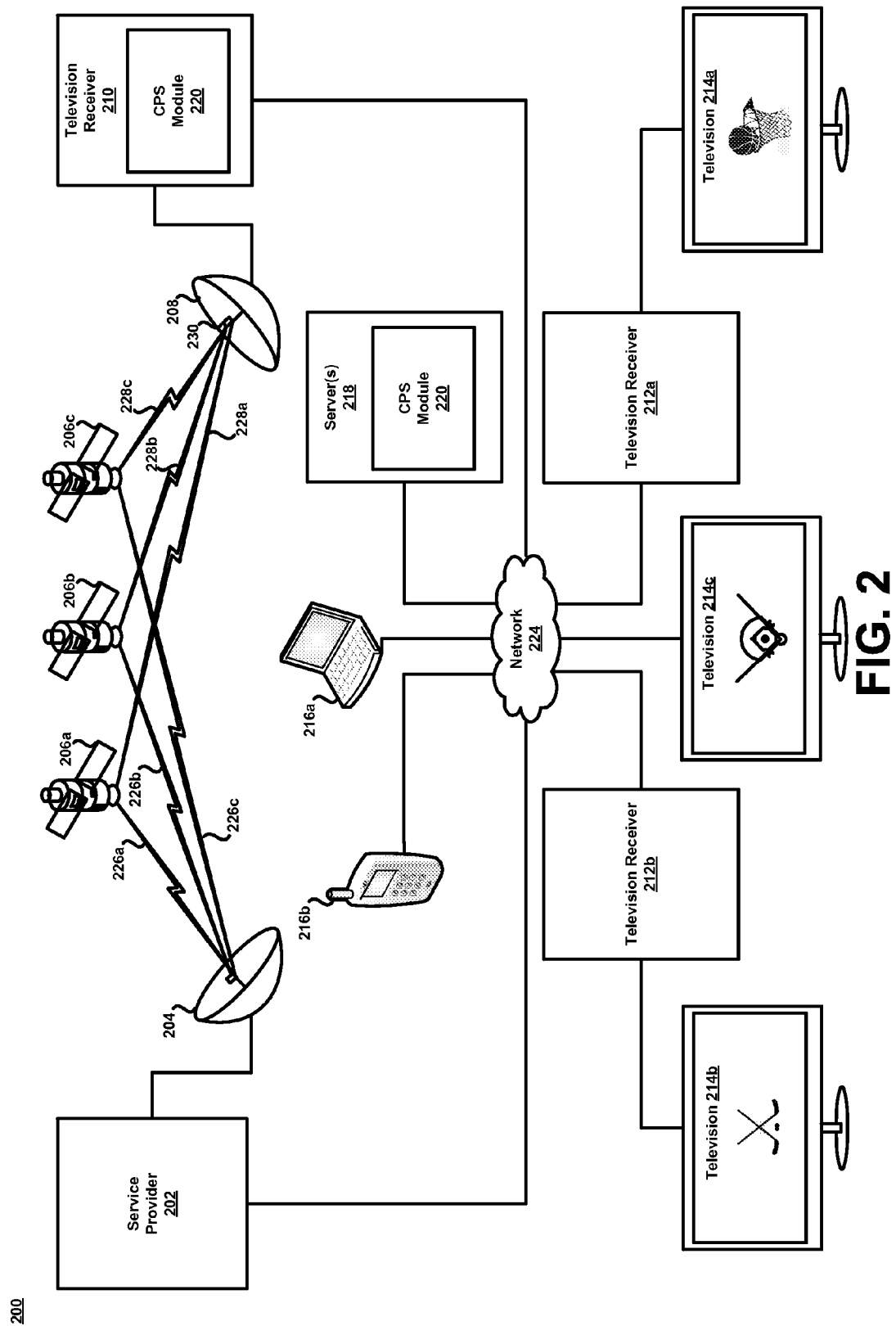
FIG. 2 shows an example satellite system in accordance with the disclosure.

Referring now to FIG. 2, an example satellite television distribution system 200 is shown in accordance with the present disclosure. For brevity, the system 200 is depicted in a simplified form, and may include more or fewer systems, devices, networks, and/or other components as desired. Further, number and type of features or elements incorporated within the system 200 may or may not be implementation-specific, and at least some of the aspects of the system 200 may be similar to a cable television distribution system, an IPTV (Internet Protocol Television) content distribution system, and/or any other type of content distribution system.

The example system 200 may include a service provider 202, a satellite uplink 204, a plurality of satellites 206*a-c*, a satellite dish 208, a PTR (Primary Television Receiver) 210, a plurality of STRs (Secondary Television Receivers) 212*a-b*, a plurality of televisions 214*a-c*, a plurality of computing devices 216*a-b*, and at least one server 218 that may be associated with the service provider 202. Additionally, the PTR 210 and/or server 218 may include a CPS (Content Provisioning Service) module 220. In general, the CPS module 220 may be configured and arranged to implement various features associated with intelligently allocating idle tuner resources of the PTR 210 and/or STRs 212*a-b* to buffer or record broadcast programming determined to be desirable or preferred by any particular user or television viewer.

For example, desired programming may be directly derived from a favorites list or listing maintained or otherwise accessible by the CPS module 220. Additionally, or alternatively, desired programming may be directly derived from historical usage information maintained or otherwise accessible by the CPS module 220. In this manner, the various features offered by the CPS module 220 as discussed throughout may serve to entice new customers to subscribe to services as offered by a particular satellite television provider, as well as provide an incentive for existing customers to maintain their loyalty and/or relationship with the particular satellite television provider. However, other benefits and/or advantages are possible as well. For example, a television viewer who might not normally be actively engaged or involved in recording programs for future viewing may nonetheless be provided access to programming that the television viewer might find desirable. Still other benefits and/or advantages are possible as well, and an appreciation of such benefits and/or advantages may be understood in light of the present disclosure in its entirety.

The system 200 may further include at least one network 224 that establishes a bi-directional communication path for data transfer between and among each respective element of the system 200, outside or separate from the unidirectional satellite signaling path. The network 224 is intended to represent any number of terrestrial and/or non-terrestrial network features or elements. For example, the network 224 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among respective elements of the system 200.

The PTR 210, and the STRs 212*a-b*, as described throughout may generally be any type of television receiver, television converter, etc., such as a STB for example. In another example, the PTR 210, and the STRs 212*a-b*, may exhibit functionality integrated as part of or into a television, a DVR (Digital Video Recorder), a computer such as a tablet computing device, or any other computing system or device, as well as variations thereof. Further, the PTR 210 and the network 224, together with the STRs 212*a-b* and televisions 214*a-c*, and possibly the computing devices 216*a-b*, may each be incorporated within or form at least a portion of a particular home computing network. Further, the PTR 210 may be configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other examples are possible. For example, one or more of the various elements or components of the example system 200 may be configured to communicate in accordance with the MoCA® (Multimedia over Coax Alliance) home entertainment networking standard. Still other examples are possible.

In practice, the satellites 206*a-c* may each be configured to receive uplink signals 226*a-c* from the satellite uplink 204. In this example, each the uplink signals 226*a-c* may contain one or more transponder streams of particular data or content, such as one or more particular television channels, as supplied by the service provider 202. For example, each of the respective uplink signals 226*a-c* may contain various media content such as encoded HD (High Definition) television channels, SD (Standard Definition) television channels, on-demand programming, programming information, and/or any other content in the form of at least one transponder stream, and in accordance with an allotted carrier frequency and bandwidth. In this example, different media content may be carried using different ones of the satellites 206*a-c*.

Further, different media content may be carried using different transponders of a particular satellite (e.g., satellite 206*a*); thus, such media content may be transmitted at different frequencies and/or different frequency ranges. For example, a first and second television channel may be carried on a first carrier frequency over a first transponder of satellite 206a, and a third, fourth, and fifth television channel may be carried on second carrier frequency over a first transponder of satellite 206b, or, the third, fourth, and fifth television channel may be carried on a second carrier frequency over a second transponder of satellite 206a, and etc. Each of these television channels may be scrambled such that unauthorized persons are prevented from accessing the television channels.

The satellites 206a-c may further be configured to relay the uplink signals 226a-c to the satellite dish 208 as downlink signals 228a-c. Similar to the uplink signals 226a-c, each of the downlink signals 228a-c may contain one or more transponder streams of particular data or content, such as various encoded and/or at least partially electronically scrambled television channels, on-demand programming, etc., in accordance with an allotted carrier frequency and bandwidth. The downlink signals 228a-c, however, may not necessarily contain the same or similar content as a corresponding one of the uplink signals 226a-c. For example, the uplink signal 226a may include a first transponder stream containing at least a first group or grouping of television channels, and the downlink signal 228a may include a second transponder stream containing at least a second, different group or grouping of television channels. In other examples, the first and second group of television channels may have one or more television channels in common. In sum, there may be varying degrees of correlation between the uplink signals 226a-c and the downlink signals 228a-c, both in terms of content and underlying characteristics.

Further, satellite television signals may be different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO®, CBS®, ESPN®, and etc. Further, the term "channel," may in some contexts carry a different meaning from or than its normal plain language meaning. For example, the term "channel" may denote a particular carrier frequency or sub-band which can be tuned to by a particular tuner of a television receiver. In other contexts though, the term "channel" may refer to a single program/content service such as HBO®.

Additionally, a single satellite may typically have multiple transponders (e.g., 32 transponders) each one broadcasting a channel or frequency band of about 24-27 MHz in a broader frequency or polarity band of about 500 MHz. Thus, a frequency band of about 500 MHz may contain numerous sub-bands or channels of about 24-27 MHz, and each channel in turn may carry a combined stream of digital data comprising a number of content services. For example, a particular hypothetical transponder may carry HBO®, CBS®, ESPN®, plus several other channels, while another particular hypothetical transponder may itself carry 3, 4, 5, 6, etc., different channels depending on the bandwidth of the particular transponder and the amount of that bandwidth occupied by any particular channel or service on that transponder stream. Further, in many instances a single satellite may broadcast two orthogonal polarity bands of about 500 MHz. For example, a first polarity band of about 500 MHz broadcast by a particular satellite may be left-hand circular polarized, and a second polarity band of about 500 MHz may be right-hand circular polarized. Other examples are possible.

Continuing with the example scenario, the satellite dish 208 may be provided for use to receive television channels (e.g., on a subscription basis) provided by the service provider 202, satellite uplink 204, and/or satellites 206a-c. For example, the satellite dish 208 may be configured to receive particular transponder streams, or downlink signals 228a-c, from one or more of the satellites 206a-c. Based on the characteristics of the PTR 210 and/or satellite dish 208, however, it may only be possible to capture transponder streams from a limited number of transponders concurrently. For example, a particular tuner of the PTR 210 may be configured to tune to a single transponder stream from a transponder of a single satellite at a time.

Additionally, the PTR 210, which is communicatively coupled to the satellite dish 208, may subsequently select via tuner, decode, and relay particular transponder streams to the television 214c for display thereon. For example, the satellite dish 208 and the PTR 210 may, respectively, be configured to receive, decode, and relay at least one premium HD-formatted television channel to the television 214c. Programming or content associated with the HD channel may generally be presented live, or from a recording as previously stored on, by, or at the PTR 210. Here, the HD channel may be output to the television 214c in accordance with the HDMI/HDCP content protection technologies. Other examples are however possible.

Further, the PTR 210 may select via tuner, decode, and relay particular transponder streams to one or both of the STRs 212a-b, which may in turn relay particular transponder streams to a corresponding one of the televisions 214a-b for display thereon. For example, the satellite dish 208 and the PTR 210 may, respectively, be configured to receive, decode, and relay at least one television channel to the television 214a by way of the STR 212a. Similar to the above-example, the television channel may generally be presented live, or from a recording as previously stored on the PTR 210, and may be output to the television 214a by way of the STR 212a in accordance with a particular content protection technology and/or networking standard. Still further, the satellite dish 208 and the PTR 210 may, respectively, be configured to receive, decode, and relay at least one premium television channel to one or both of the computing device 216a-b. Similar to the above-examples, the television channel may generally be presented live, or from a recording as previously stored on the PTR 210, and may be output to one or both of the computing devices 216a-b in accordance with a particular content protection technology and/or networking standard.

Figure 3:
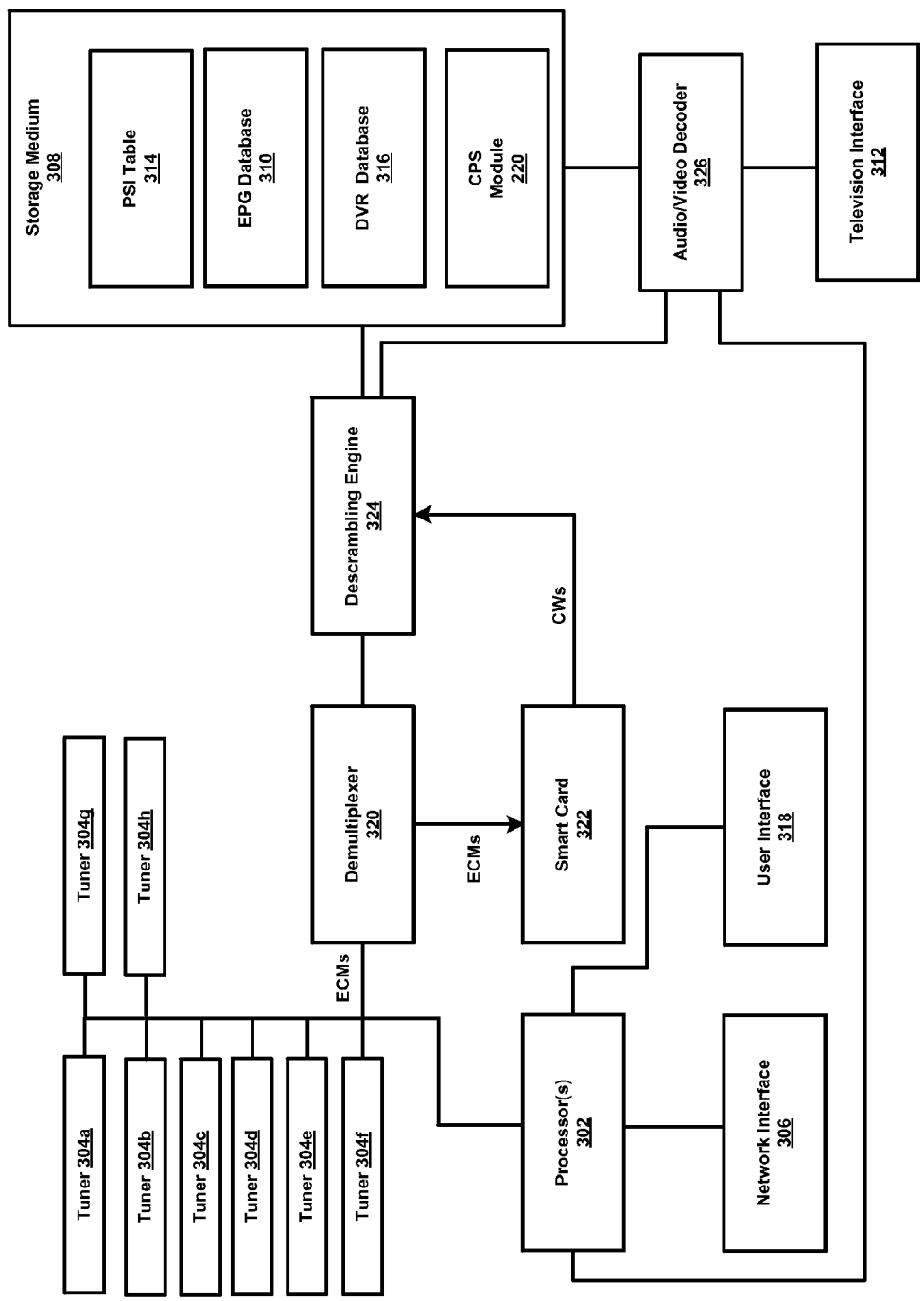
FIG. 3 shows an example block diagram of a television receiver of FIG. 2.

Referring now to FIG. 3, an example block diagram of the PTR 210 of FIG. 2 is shown in accordance with the disclosure. In some examples, STRs 312a-b may be configured in a manner similar to that of the PTR 210. In some examples, the STRs 312a-b may be configured and arranged to exhibit a reduced functionality as compared to the PTR 210, and may depend at least to a certain degree on the PTR 210 to implement certain features or functionality. The STRs 312a-b in this example may be each referred to as a "thin client."

The PTR 210 may include one or more processors 302, a plurality of tuners 304a-h, at least one network interface 306, at least one non-transitory computer-readable storage medium 308, at least one EPG (Electronic Programming Guide) database 310, at least one television interface 312, at least one PSI (Program Specific Information) table 314, at least one DVR database 316, at least one user interface 318, at least one demultiplexer 320, at least one smart card 322, at least one descrambling engine 324, and at least one decoder 326. In other examples, fewer or greater numbers of components may be present. Further, functionality of one or more components may be combined; for example, functions of the descrambling engine 324 may be performed by the processors 302. Still further, functionality of components may be distributed among additional components, and possibly additional systems such as, for example, in a cloud-computing implementation.

The processors 302 may include one or more specialized and/or general-purpose processors configured to perform processes such as tuning to a particular channel, accessing and displaying EPG information, and/or receiving and processing input from a user. For example, the processors 302 may include one or more processors dedicated to decoding video signals from a particular format, such as according to a particular MPEG (Motion Picture Experts Group) standard, for output and display on a television, and for performing or at least facilitating decryption or descrambling.

The tuners 304a-h may be used to tune to television channels, such as television channels transmitted via satellites 306a-c. Each one of the tuners 304a-h may be capable of receiving and processing a single stream of data from a satellite transponder, or a cable RF channel, at a given time. As such, a single tuner may tune to a single transponder or, for a cable network, a single cable channel. Additionally, one tuner (e.g., tuner 304a) may be used to tune to a television channel on a first transponder stream for display using a television, while another tuner (e.g., tuner 304b) may be used to tune to a television channel on a second transponder for recording and viewing at some other time. If multiple television channels transmitted on the same transponder stream are desired, a particular tuner (e.g., tuner 304c) may be used to receive the signal containing the multiple television channels for presentation and/or recording of each of the respective multiple television channels, such as in a PTAT (Primetime Anytime) implementation for example. Although eight tuners are shown, the PTR 210 may include more or fewer tuners (e.g., three tuners, twelve tuners, etc.), and the features of the disclosure may be implemented similarly and scale according to the number of tuners of the PTR 210.

The network interface 306 may be used to communicate via alternate communication channel(s) with a service provider. For example, the primary communication channel between the service provider 202 of FIG. 2 and the PTR 210 may be via satellites 306a-c, which may be unidirectional to the PTR 210, and an another communication channel between the service provider 202 and the PTR 210, which may be bidirectional, may be via the network 224. In general, various types of information may be transmitted and/or received via the network interface 306. The storage medium 308 may represent a non-transitory computer-readable storage medium. The storage medium 308 may include memory and/or a hard drive. The storage medium 308 may be used to store information received from one or more satellites and/or information received via the network interface 306. For example, the storage medium 308 may store information related to the EPG database 310, the PSI table 314, and/or the DVR database 316, among other elements or features, such as the CPS module 220 mentioned above. Recorded television programs may be stored using the storage medium 308.

The EPG database 310 may store information related to television channels and the timing of programs appearing on such television channels. Information from the EPG database 310 may be used to inform users of what television channels or programs are available, popular and/or provide recommendations. Information from the EPG database 310 may be used to generate a visual interface displayed by a television that allows a user to browse and select television channels and/or television programs for viewing and/or recording. Information used to populate the EPG database 310 may be received via the network interface 306 and/or via satellites 206a-c of FIG. 2. For example, updates to the EPG database 310 may be received periodically via satellite. The EPG database 310 may serve as an interface for a user to control DVR functions of the PTR 210, and/or to enable viewing and/or recording of multiple television channels simultaneously.

The decoder 326 may convert encoded video and audio into a format suitable for output to a display device. For instance, the decoder 326 may receive MPEG video and audio from the storage medium 308, or the descrambling engine 324, to be output to a television. MPEG video and audio from the storage medium 308 may have been recorded to the DVR database 316 as part of a previously-recorded television program. The decoder 326 may convert the MPEG video and audio into a format appropriate to be displayed by a television or other form of display device and audio into a format appropriate to be output from speakers, respectively. The decoder 326 may be a single hardware element capable of decoding a finite number of television channels at a given time, such as in a time-division arrangement. In the example embodiment, eight television channels may be decoded concurrently or simultaneously.

The television interface 312 output a signal to a television, or another form of display device, in a proper format for display of video and play back of audio. As such, the television interface 312 may output one or more television channels, stored television programming from the storage medium 308, such as television programs from the DVR database 316 and/or information from the EPG database 310 for example, to a television for presentation. The PSI table 314 may store information used by the PTR 210 to access various television channels. Information used to populate the PSI table 314 may be received via satellite, or cable, through the tuners 304a-h and/or may be received via the network interface 306 over the network 224 from the service provider 202 shown in FIG. 2. Information present in the PSI table 314 may be periodically or at least intermittently updated. Information that may be present in the PSI table 314 may include: television channel numbers, satellite identifiers, frequency identifiers, transponder identifiers, ECM PIDs (Entitlement Control Message, Packet Identifier), one or more audio PIDs, and video PIDs. A second audio PID of a channel may correspond to a second audio program, such as in another language. In some examples, the PSI table 314 may be divided into a number of tables, such as a NIT (Network Information Table), a PAT (Program Association Table), a PMT (Program Management Table), etc.

Table 1 below provides a simplified example of the PSI table 314 for several television channels. It should be understood that in other examples, many more television channels may be represented in the PSI table 314. The PSI table 314 may be periodically or at least intermittently. As such, television channels may be reassigned to different satellites and/or transponders, and the PTR 210 may be able to handle this reassignment as long as the PSI table 314 is updated.

TABLE 1

| Channel | Satellite | Transponder | ECM PID | Audio PIDs | Video PID |
|---------|-----------|-------------|---------|------------|-----------|
| 4 | 1 | 2 | 27 | 2001 | 1011 |
| 5 | 2 | 11 | 29 | 2002 | 1012 |

TABLE 1-continued

| Channel | Satellite | Transponder | ECM PID | Audio PIDs | Video PID |
|---|---|---|---|---|---|
| 7 | 2 | 3 | 31 | 2003 | 1013 |
| 13 | 2 | 4 | 33 | 2003, 2004 | 1013 |

It should be understood that the values provided in Table 1 are for example purposes only. Actual values, including how satellites and transponders are identified, may vary. Additional information may also be stored in the PSI table 314. Video and/or audio for different television channels on different transponders may have the same PIDs. Such television channels may be differentiated based on which satellite and/or transponder to which a tuner is tuned.

DVR functionality of the PTR 210 may permit a television channel to be recorded for a period of time. The DVR database 316 may store timers that are used by the processors 302 to determine when a television channel should be tuned to and recorded to the DVR database 316 of storage medium 308. In some examples, a limited amount of space of the storage medium 308 may be devoted to the DVR database 316. Timers may be set by the service provider 202 and/or one or more users of the PTR 210. DVR functionality of the PTR 210 may be configured by a user to record particular television programs. The PSI table 314 may be used by the PTR 210 to determine the satellite, transponder, ECM PID, audio PID, and video PID.

The user interface 318 may include a remote control, physically separate from PTR 210, and/or one or more buttons on the PTR 210 that allows a user to interact with the PTR 210. The user interface 318 may be used to select a television channel for viewing, view information from the EPG database 310, and/or program a timer stored to the DVR database 316 wherein the timer may be used to control the DVR functionality of the PTR 210.

Referring back to the tuners 304a-h, television channels received via satellite may contain at least some encrypted or scrambles data. Packets of audio and video may be scrambled to prevent unauthorized users, such as nonsubscribers, from receiving television programming without paying the service provider 202. When one of the tuners 304a-h is receiving data from a particular transponder of a satellite, the transponder stream may be a series of data packets corresponding to multiple television channels. Each data packet may contain a PID, which in combination with the PSI table 314, can be determined to be associated with a particular television channel. Particular data packets, referred to as ECMs may be periodically transmitted. ECMs may be encrypted; the PTR 210 may use the smart card 322 to decrypt ECMs.

The smart card 322 may function as the CA (Controlled Access) which performs decryption of encryption data to obtain control words that are used to descramble video and/or audio of television channels. Decryption of an ECM may only be possible when the user (e.g., an individual who is associated with the PTR 210) has authorization to access the particular television channel associated with the ECM. When an ECM is received by the demultiplexer 320 and the ECM is determined to correspond to a television channel being stored and/or displayed, the ECM may be provided to the smart card 322 for decryption.

When the smart card 322 receives an encrypted ECM from the demultiplexer 320, the smart card 322 may decrypt the ECM to obtain some number of control words. In some examples, from each ECM received by the smart card 322, two control words are obtained. In some examples, when the smart card 322 receives an ECM, it compares the ECM to the previously received ECM. If the two ECMs match, the second ECM is not decrypted because the same control words would be obtained. In other examples, each ECM received by the smart card 322 is decrypted; however, if a second ECM matches a first ECM, the outputted control words will match; thus, effectively, the second ECM does not affect the control words output by the smart card 322. When an ECM is received by the smart card 322, it may take a period of time for the ECM to be decrypted to obtain the control words. As such, a period of time, such as about 0.2-0.5 seconds, may elapse before the control words indicated by the ECM can be obtained. The smart card 322 may be permanently part of the PTR 210 or may be configured to be inserted and removed from the PTR 210.

The demultiplexer 320 may be configured to filter data packets based on PIDs. For example, if a transponder data stream includes multiple television channels, data packets corresponding to a television channel that are not desired to be stored or displayed by the user may be ignored by the demultiplexer 320. As such, only data packets corresponding to the one or more television channels desired to be stored and/or displayed may be passed to either the descrambling engine 324 or the smart card 322; other data packets may be ignored. For each channel, a stream of video packets, a stream of audio packets and/or a stream of ECM packets may be present, each stream identified by a PID. In some examples, a common ECM stream may be used for multiple television channels. Additional data packets corresponding to other information, such as updates to the PSI table 314, may be appropriately routed by the demultiplexer 320.

The descrambling engine 324 may use the control words output by the smart card 322 in order to descramble video and/or audio corresponding to television channels for storage and/or presentation. Video and/or audio data contained in the transponder data stream received by the tuners 304a-h may be scrambled. The video and/or audio may be descrambled by the descrambling engine 324 using a particular control word. Which control word output by the smart card 322 to be used for successful descrambling may be indicated by a scramble control identifier present within the data packet containing the scrambled video or audio. Descrambled video and/or audio may be output by the descrambling engine 324 to the storage medium 308 for storage, such as part of the DVR database 316 for example, and/or to the decoder 326 for output to a television or other presentation equipment via the television interface 312.

For brevity, the PTR 210 is depicted in a simplified form, and may generally include more or fewer elements or components as desired, including those configured and/or arranged for implementing various features associated with intelligently allocating idle tuner resources to buffer or record broadcast programming determined as desirable, as discussed in the context of the present disclosure. For example, the PTR 210 is shown in FIG. 3 to include the CPS module 220 as mentioned above in connection with FIG. 2. While shown stored to the storage medium 308 as executable instructions, the CPS module 220 could, wholly or at least partially, be stored to the processor(s) 302 of the PTR 210. Further, some routing between the various modules of PTR 210 has been illustrated. Further, some routing between the various modules of PTR 210 has been illustrated. Such illustrations are for exemplary purposes only. The state of two modules not being directly or indirectly connected does not indicate the modules cannot communicate. Rather, connections between modules of the PTR 210 are intended only to indicate possible common data routing. It should be understood that the modules of the PTR 210 may be combined into a fewer number of modules or divided into a greater number of modules.

Additionally, although not explicitly shown in FIG. 3, the PTR 210 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Further, the PTR 210 may be configured to include any number of other various components or logical modules that are implemented in hardware, software, firmware, or any combination thereof, and such components or logical modules may or may not be implementation-specific.

Figure 4:
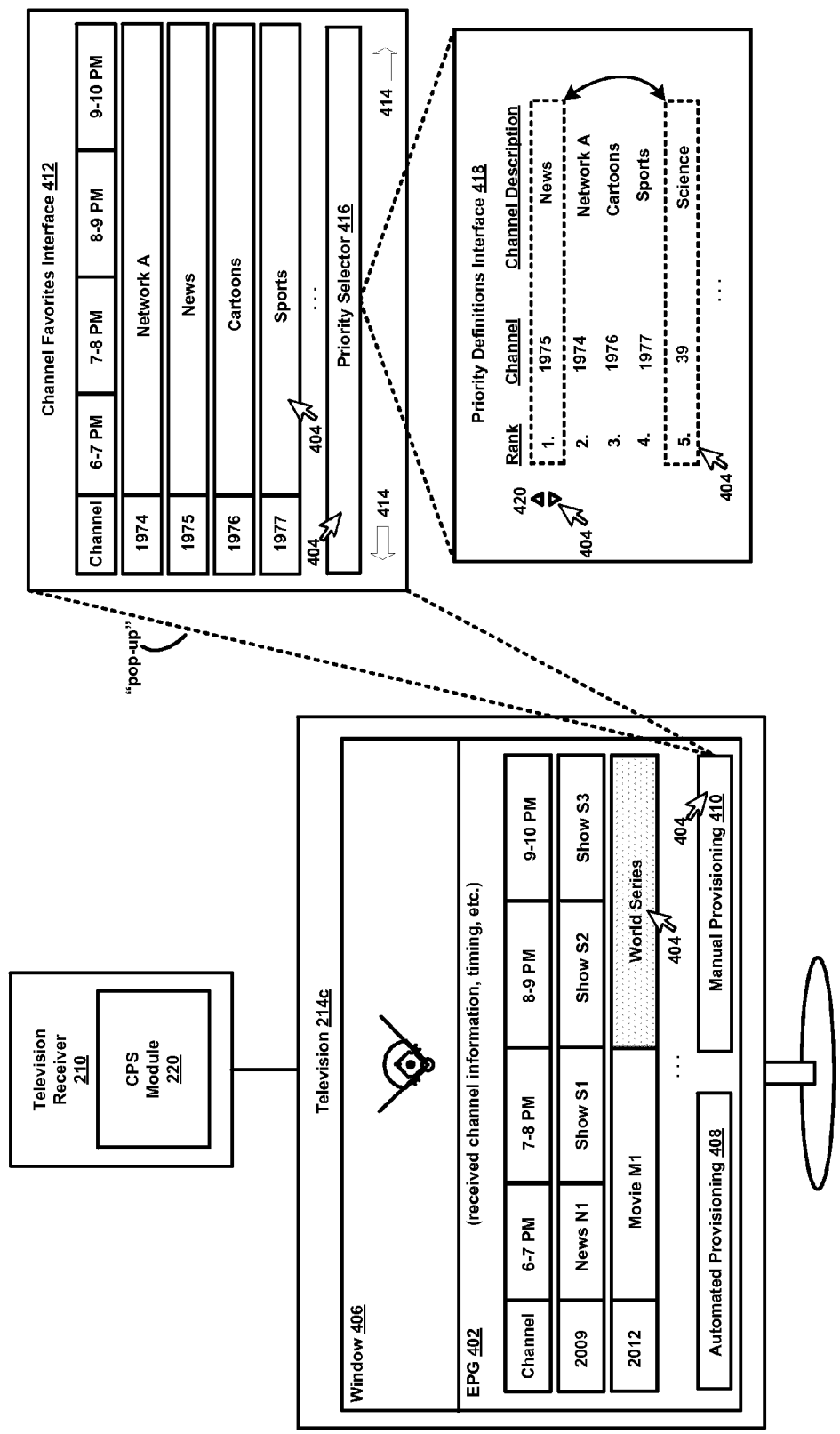
FIG. 4 shows first example aspects of the system of FIG. 2 in detail.

Referring now to FIG. 4, first aspects of the example system 200 of FIG. 2 are shown in detail. In particular, the PTR 210 may be configured to output an EPG (Electronic Programming Guide) 402 to and for presentation the television 214c, for example. The EPG 402 may at least present various information related to television channels and the timing of programs or programming appearing on such television channels. For example, as shown in FIG. 4, the EPG 402 may display information associated with a channel 2012, where the "World Series" is listed as scheduled to appear on that channel starting at a particular time on a particular day, and etc. In this example, and assuming that a current time is sometime during the time period 8-10 PM, a viewer may manipulate a cursor 404 using a pointing device (not shown) to select, as shown by stipple shading in FIG. 4, the World Series for immediate viewing within a window 406 on the television 114c. Other examples are possible. For example, it is contemplated that any menu-driven navigation technique or implementation may be used to enable user-interaction with the EPG 402, along with other elements or interfaces output by the PTR 210 to the television 214c.

In addition to the EPG 402, the PTR 210 may be configured to output various other interactive elements or interfaces. For example, the CPS module 220 may be configured to output an automated provisioning selection 408 and a manual provisioning selection 410. In general, the automated provisioning selection 408 may optionally be selected so that the CPS module 220 may implement an automated process or algorithm that leverages historical or empirical usage data so that the CPS module 220 may intelligently allocate idle tuner resources of the PTR 210 to buffer or record broadcast programming determined to be desirable or preferred by any particular user or television viewer, as discussed in further detail below.

Similarly, the manual provisioning selection 410 may optionally be selected so that the CPS module 220 may implement various other interactive elements or interfaces so that a particular user or television viewer may manually define or specify one or more favorites channels within a favorites listing, as well as a particular priority scheme as desired, so that the CPS module 220 may intelligently allocate idle tuner resources of the PTR 210 to buffer or record broadcast programming determined to be desirable or preferred by any particular user or television viewer. For example, a viewer may manipulate the cursor 404 to select the manual provisioning selection 410, via a "point and double-click" action or "point and click" action or a "highlight and select" action using a remote control for example and, in response, the CPS module 220 may be configured to output a channel favorites interface 412 to and for presentation by the television 214c. In general, the channel favorites interface 412 is similar to the EPG 402.

For example, the channel favorites interface 412 may at least present various information related to television channels and the timing of programs or programming appearing on such television channels. However, the television channels displayed with or within the channel favorites interface 412 may not necessarily, but could, itemize particular broadcast programming such as that normally displayed within the EPG 402. In particular, the television channels displayed with the channel favorites interface 412 may only specify type of content on any particular channel, particular channel name, etc. For example, as shown in FIG. 4, the channel favorites interface 412 may display information associated with a Channel 1977 where a subscriber or viewer or user may easily discern that only sports programming is scheduled to be output on that channel at a particular time on a particular day, and etc.

In this example, a viewer may manipulate the cursor 404 within the channel favorites interface 412 to select the icon or identifier associated with the Channel 1977, so that the CPS module 220 may discern that Channel 1977 is a favorite channel. It is contemplated that the viewer may interact with icons 414 to scroll through the channel favorites interface 412 to select as many favorite channels as desired. In this example, any particular channel selected as a favorite channel may not necessarily, but could, be more preferred than other channels selected as a favorite. Accordingly, the CPS module 220 may be configured to output a priority selector 416 within the channel favorites interface 412 to and for presentation by the television 214c that may be used by a viewer to define a priority scheme wherein any particular channel selected as a favorite channel may be designated as "more preferred" than another favorite channel(s).

For example, a viewer may manipulate the cursor 404 to select the priority selector 416 and, in response, the CPS module 220 may be configured to output a priority definitions interface 418 to and for presentation by the television 214c. In this example, the cursor 404 may be used to associate a rank or ranking with each particular television channel identified as a favorite, to define a priority scheme. For example, the cursor 404 may be used to highlight or select a particular television channel, shown or indicated by intermittent line in FIG. 4, and then the cursor 404 may be used to manipulate a selected television channel to define its priority. It is contemplated that this action may be performed in many different ways.

For example, a Channel 1975 may be selected and then the cursor 404 may be used to activate toggle 420 to promote Channel 1975 to Priority 1. In another example, both the Channel 1975 and a Channel 39 may be selected and then the cursor 404 may be used to "drag and swap" Channel 1975 and Channel 39, so that Channel 1975 is set to Priority 1 and Channel 39 is set to Priority 5. Still many other examples are possible, and it is contemplated that the CPS module 220 may leverage that information discussed in connection with FIG. 4, along with other information, to intelligently allocates idle tuner resources of the PTR 210 to buffer or record broadcast programming determined to be desirable or preferred by any particular user or television viewer.

Figure 5:
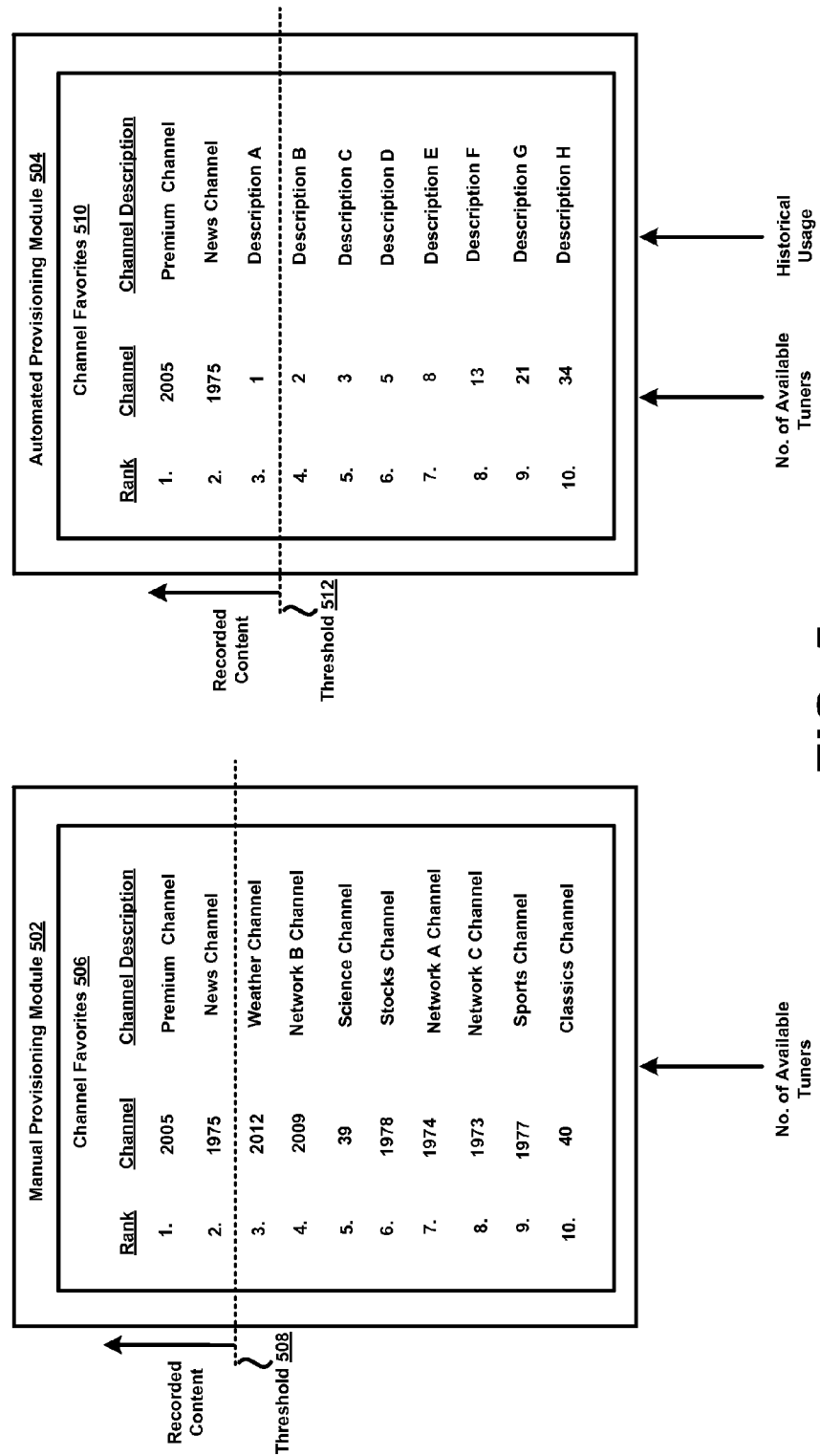
FIG. 5 shows second example aspects of the system of FIG. 2 in detail.

For example, referring now to FIG. 5, second aspects of the example system 200 of FIG. 2 are shown in detail. In particular, a number of modules of the CPS module 220 are shown, including a manual provisioning module 502 and an automated provisioning module 504. In general, the manual provisioning module 502 may be engaged or otherwise activated upon the CPS module 220 detecting selection of the manual provisioning selection 410, and the automated provisioning module 504 may be engaged or otherwise activated upon the CPS module 220 detecting selection of the automated provisioning selection 408, each as discussed above in connection with FIG. 4.

In practice, the manual provisioning module 502 may implement various interactive elements or interfaces so that a particular user or television viewer may manually define or specify one or more favorites channels within a favorites listing, as well as a particular priority scheme as desired, so that the CPS module 220 may intelligently allocate idle tuner resources of the PTR 210 of at least FIG. 2 to buffer or record broadcast programming determined to be desirable or preferred by any particular user or television viewer. Similarly, the automated provisioning module 504 may implement an automated process or algorithm that leverages historical or empirical usage data so that the CPS module 220 may intelligently allocate idle tuner resources of the PTR 210 to buffer or record broadcast programming determined to be desirable or preferred by any particular user or television viewer.

For example, the manual provisioning module 502 as shown in FIG. 5 includes or otherwise has access to a first channel favorites listing 506. The first listing 506 includes a plurality of identified channels listed according to a priority scheme, wherein any particular channel that has a "higher" rank or ranking (i.e., a "lower" number) may be understood to be more preferred than other channels that have a "lower" ranking (i.e., a "higher" number). For example, Channel 2005 has a higher ranking and is thus "more preferred" than Channel 1975, and so on. It is contemplated that the rankings, as well as the specific channels, as contained within the first listing 506 have been manually defined, in a manner similar to that discussed above in connection with FIG. 4.

At a particular time, such as upon a channeling event similar to that discussed above in connection with FIG. 1, the manual provisioning module 502 may access the first listing 506, determine or evaluate a number of tuners available to record television channels that are listed within the first listing 506, and then allocate available tuners so that the PTR 210 may tune-to, decode, and ultimately output for display by a presentation device broadcast programming associated with ones of the favorites channels as contained within the first listing 506. For simplicity, it is assumed that the PTR 210 is a three (3) tuner receiver, not an eight (8) tuner receiver as shown in FIG. 2, and thus in the present example the scenario may always exist wherein the PTR 210 determines that a number of available tuners is less than a total number of entries within the first listing 506 (see e.g., step 108 of FIG. 1), since there are ten (10) entries in the first listing 506. Other examples are possible, and it is contemplated that features of the present disclosure may be implemented similarly and scale according to any particular number of tuners of the PTR 210.

In the present example though, the manual provisioning module 502 may identify the priority scheme within the first listing 506 in order to select the "most preferred" television channels to record at any particular time. For example, the manual provisioning module 502 may have previously determined that the first listing 506 contains the following entries: Priority 1, Channel 2005; Priority 2, Channel 1975; Priority 3, Channel 2012; Priority 4, Channel 2009; Priority 5, Channel 39; Priority 6, Channel 1978; Priority 7, Channel 1974; Priority 8, Channel 1973; Priority 9, Channel 1977; Priority 10, Channel 40. Further, the manual provisioning module 502 may determine a particular television channel that is currently output by the PTR 210 for display by the television 214c is Channel 1, for example. In the example three (3) tuner implementation, and assuming that none of the channels within first listing 506 or Channel 1 reside on a same satellite transponder frequency, a particular tuner may be allocated to each one of the Channel 2005, Channel 1975, and Channel 1, so that the PTR 210 may tune-to, decode, and ultimately output for display by the television 214c broadcast programming associated with each of the Channel 2005, Channel 1975, and Channel 1 as or when desired. This is captured in in FIG. 5 by a threshold 508 above which shows the channel favorites within the first listing 506 that are currently being recorded. Other examples are possible.

For example, as shown in FIG. 5, the automated provisioning module 504 includes or otherwise has access to a second channel favorites listing 510. The second listing 510 includes a plurality of identified channels listed according to a priority scheme, wherein any particular channel that has a "higher" rank or ranking (i.e., a "lower" number) may be understood to be more preferred than other channels that have a "lower" ranking (i.e., a "higher" number). For example, Channel 2005 has a higher ranking and is thus "more preferred" than Channel 1975, and so on. It is contemplated that the rankings, as well as the specific channels, as contained within the second listing 510 have been automatically defined, or defined in hybrid manner similar to that mentioned above in connection with FIG. 1 and discussed in further detail below.

At a particular time, such as upon a channeling event similar to that discussed above in connection with FIG. 1, the automated provisioning module 504 may access the second listing 510, determine or evaluate a number of tuners available to record television channels that are listed within the second listing 510, and then allocate available tuners so that the PTR 210 may tune-to, decode, and ultimately output for display by a presentation device broadcast programming associated with ones of the favorites channels as contained within the second listing 510. Again, for simplicity, it is assumed that the PTR 210 is a three (3) tuner receiver, not an eight (8) tuner receiver as shown in FIG. 2, and thus in the present example the scenario may always exist wherein the PTR 210 determines that a number of available tuners is less than a total number of entries within the second listing 510 (see e.g., step 108 of FIG. 1), since there are ten (10) entries in the second listing 510. Other examples are possible.

In the present example, the automated provisioning module 504 may identify the priority scheme within the second listing 510 in order to select the "most preferred" television channels to record at any particular time. For example, the automated provisioning module 504 may have previously determined that the second listing 508 contains the following entries: Priority 1: Channel 2005; Priority 2: Channel 1975; Priority 3: Channel 1; Priority 4: Channel 2; Priority 5: Channel 3; Priority 6: Channel 5; Priority 7: Channel 8; Priority 8: Channel 13; Priority 9: Channel 21; and Priority 10: Channel 34. Further, the manual provisioning module 502 may determine a particular television channel that is currently output by the PTR 210 for display by the television 214c is Channel 1974 for example. In the example three (3) tuner implementation, and assuming that Channel 1 resides on a same satellite transponder frequency as Channel 1975, for example, a particular tuner may be allocated to each one of the Channel 2005, Channel 1975 and Channel 1, and Channel 274 so that the PTR 210 may tune-to, decode, and ultimately output for display by the television 214*c* broadcast programming associated with each of the Channel 2005, Channel 1975 and Channel 1, and Channel 274 as or when desired. This is captured in in FIG. 5 by a threshold 512 above which shows the channel favorites within the second listing 510 that are currently being recorded. Other examples are possible.

In the example discussed in connection with the automated provisioning module 504, the discussion of which may in some examples be applicable to the manual provisioning module 502, it is assumed that Channel 1 resides on a same satellite transponder as Channel 1975. This may be of significance as in some implementations the PTR 210 may receive swaths of bandwidth from an LNB 230 (Low-Noise Block Downconverter) as shown in FIG. 1 on a transponder-level basis, and may be configured to operate on each transponder to decode, and ultimately output for display by a presentation device broadcast programming associated with ones of favorites channels as contained or embedded within a particular transponder. This is why the PTR 210 may in some scenarios record more channels than number of available tuners (e.g., as shown in FIG. 5).

Figure 6:
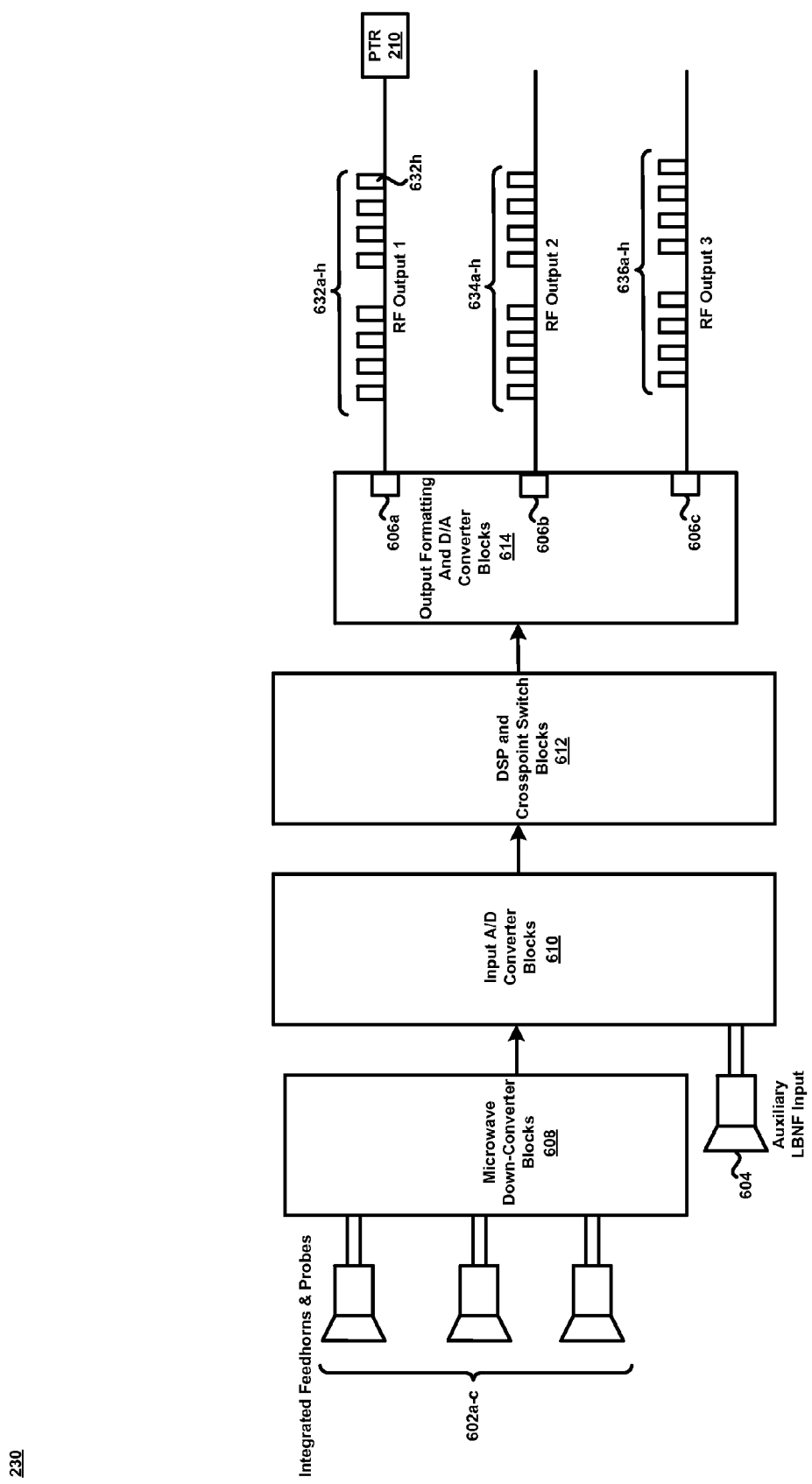
FIG. 6 shows an example block downconverter in accordance with the disclosure.

For example, referring now additionally to FIG. 6, a simplified example architecture of the LNB 230 is shown in accordance with the present disclosure. In general, one or more modules or components of the LNB 230 may be realized in or as, or incorporated within or on, for example, an ASIC (Application Specific Integrated Circuit), SoC (System on Chip), and/or other type of integrated circuit implementation. In FIG. 6, the LNB 230 is configured as a channel-stacking LNB. Other examples are however possible. For example, in some examples the LNB 230 may be configured as a dual-band translation LNB. In other examples, the LNB 230 may be configured as a triple-band translation LNB. The principles of the present disclosure apply in each situation or implementation.

The LNB 230 may be mounted to or integrated with a feedhorn that is coupled to the satellite dish 208 of FIG. 2, but may include RF probes 602*a-c*, along with an auxiliary RF probe 604, and RF output ports 606*a-c*. In this example, the probes 602*a-c* may operate independently from each other, and the LNB 230 may detect or receive incoming signals broadcast from each of the satellites 206*a-c* via the probes 602*a-c*, assuming that the satellite dish 208 is properly orientated towards the sky. The ports 606*a-c* too may be independent from each other, and each of the respective ports 606*a-c* may be coupled to a particular distinct receiver via coaxial cable, for example, to source channels containing programming as requested by each respective receiver.

In operation, a first stage 608 in the signal path may at least amplify and mix down incoming satellite signals to an intermediate frequency band, such as L-Band or S-Band for example. It is contemplated that the first stage example may be implementation-specific, and may evolve as technology evolves. In one embodiment, the first stage 608 may be realized as or include a heterodyne along with additionally components to mix down an input signal down to an IF frequency. Other examples are however possible. For example, the first stage 608 may be implemented as a direct conversion block, where an input signal is mixed down to baseband. Still other examples are possible.

A second stage 610 in the signal path may sample incoming satellite signals according to the Nyquist Theorem so that the signals may be further processed in the digital domain following the second stage 610. A third stage 612 and a fourth stage 614 in the signal path may operate on or further process the digitized signals so that the LNB 230 may source channels containing programming to a particular receiver coupled to a particular one of the ports 606*a-c*, such as the PTR 210 shown as coupled to port 606*a*. For example, when a particular receiver coupled to the port 606*a* is configured as a triple-band band translation device, the third stage 612 and the fourth stage 614 may together serve to format the output of the second stage 610 so that data output on port 606*a* is formatted according to a triple-band band translation mode.

In another example, when a particular receiver coupled to the port 606*b* is configured as a channel-stacking device, the third stage 612 and the fourth stage 614 may together serve to format the output of the second stage 610 so that data output on port 606*b* is formatted according to a channel-stacking mode. In still another example, when a particular receiver coupled to the port 606*c* is configured as a dual-band band translation device, the third stage 612 and the fourth stage 614 may together serve to format the output of the second stage 610 so that data output on port 606*c* is formatted according to a dual-band band translation mode.

As shown in FIG. 6, and mentioned above, the LNB 230 is configured as a channel-stacking LNB. Accordingly, a first plurality of bands 632*a-h* each with a width of about 30 MHz are shown as being created and output by the LNB 230 on the port 606*a*. Further, a second plurality of bands 634*a-h* each with a width of about 30 MHz are shown as being created and output by the LNB 230 on the port 606*b*. Still further, a third plurality of bands 636*a-h* each with a width of about 30 MHz are shown as being created and output by the LNB 230 on the port 606*c*. In general, FIG. 6 is intended to represent that each tuner of a particular eight tuner receiver (i.e., the PTR 210 as shown in FIG. 2) coupled to one of the port 606*a-c* via coaxial cable may request any frequency band from one of the satellites 206*a-c*, and yet receive the frequency band in the frequency range for which a corresponding tuner has already been programmed.

For example, a particular tuner of the PTR 210 may be programmed to receive the band 950-1450 MHz (i.e., within L-band), while another particular tuner of the PTR 210 may be programmed to receive the band 1650-2150 MHz (i.e., within S-band). However, more than one tuner of the PTR 210 may be may be programmed to receive the same or similar band, such as the band 950-1450 MHz. In any case, the band 632*h* as output on port 606*a* for example may contain both Channel 1975 and Channel 1 similar to that mentioned above in connection with FIG. 5, and the PTR 210 may be configured to operate on the transponder band 632*h* to decode, and ultimately output for display by a presentation device broadcast programming associated with both Channel 1975 and Channel 1 as contained or embedded within the particular transponder band 632*h*. This is why the PTR 210 may in some scenarios record more channels than number of available tuners (e.g., as shown in FIG. 5). In particular, the PTR 210 may operate on the particular transponder band 632*h* to extract both Channel 1975 and Channel 1, and separately store content from Channel 1975 and Channel 1 into memory (e.g., storage medium 308 as shown in FIG. 3). Other examples are possible.

Referring now back to FIGS. 4-5, and as mentioned above, it is contemplated that the rankings, as well as the specific channels, as contained within the second listing 510 have been automatically defined, or defined in hybrid manner. In general, this process may be implemented wholly by the PTR 210, or partly by the PTR 210 in combination with the server 218 as shown in FIG. 2. For example, in one embodiment, a viewer may manipulate the cursor 404 to select the priority selector 416 to promote Channel 2005 to Priority 1, and Channel 1975 to Priority 2, within the second listing 510. In contrast, the automated provisioning module 504 may implement an automated process or algorithm that leverages historical or empirical usage data to define or specify other priorities within the second listing 510. For example, the automated provisioning module 504 may monitor over time usage data to determine that Channel 1 is frequently tuned-to and output by the PTR 210 for display by a presentation device, more so than Channels 2, 3, 5, 8, 13, 21, and 24 as itemized within the second listing 510, in that specific order.

For example, the automated provisioning module 504 may determine on a continuous, possibly rolling basis over a predetermined and configurable time period, such as 1 day, 1 week, 1 month, 1 year, or any other time interval, that: Channel 1 is tuned-to 10% of total usage time; Channel 2 is tuned-to 9% of total usage time; Channel 3 is tuned-to 8% of total usage time; Channel 5 is tuned-to 7% of total usage time; Channel 8 is tuned-to 6% of total usage time; Channel 13 is tuned-to 5% of total usage time; Channel 21 is tuned-to 4% of total usage time; and Channel 34 is tuned-to 3% of total usage time. Based on this empirical data, the automated provisioning module 504 may populate the second listing 510 in a manner as shown in FIG. 5. Many other examples are possible, and it is contemplated that virtually any data acquirable by the automated provisioning module 504 may be leveraged to generate the second listing 510. For example, content that is recorded via recording timer may be analyzed to, at least in part, generate the second listing 510, content that is downloaded via on-demand may be analyzed to, at least in part, generate the second listing 510, identifiable tags that may include or specify any conceivable type of aspect or attribute of content within a particular packet (e.g., a video or audio packet as parsable by the PTR 210) may be analyzed to, at least in part, generate the second listing 510. Still other examples are possible.

As mentioned above, the various features or aspects of the present disclosure address various issues associated with mismanagement or underutilization of television receiver resources by virtue of providing a service that intelligently allocates idle tuner resources to buffer or record broadcast programming determined to be desirable or preferred by any particular user or television viewer. For instance, the methods, systems, devices, computer program products, etc., of the present disclosure may be configured and/or arranged to or for identifying a particular tuner of a multi-tuner television receiver, wherein the particular tuner is designated as in an idle mode. In some examples, a particular tuner in idle mode may refer to a tuner that is currently or instantly not being utilized to, in a traditional or conventional or typical sense, serve content to a particular system or device, such as a television, smartphone, or particular persistent memory location for storage thereon. The methods, systems, devices, computer program products, etc., of the present disclosure may also be configured and/or arranged to or for accessing, in response to the identifying, a listing that itemizes a plurality of television channels to be recorded by the television receiver for an indeterminate time period. In some examples, the listing may correspond to a "favorites" list or listing, and the indeterminate time period may refer to a time period that does not have an "end" explicitly defined.

The methods, systems, devices, computer program products, etc., of the present disclosure may also be configured and/or arranged to or for recording at least one television channel of the plurality of television channels using the particular tuner while the particular tuner is designated as in the idle mode. Here, even though the particular tuner is currently or instantly being used to record the at least one television channel of the plurality of television channels, "status" of the particular tuner is maintained to be in the "idle mode," the particular tuner is being used in a nontraditional or nonconventional or atypical sense in that the particular tuner is being used to record the at least one television channel as itemized within the above-mentioned listing. That listing is not static, and is instead dynamic and in some implementations used to buffer or record broadcast programming determined to be desirable or preferred by any particular user or television viewer so that the television receiver may "make ready" or "make available" at all times programming that might be considered to be "preferred" by the particular user. In this manner, it is contemplated that preferred media content may be instantly available to the particular user at any particular time when called upon.

The methods, systems, devices, computer program products, etc., of the present disclosure may also be configured and/or arranged to or for determining a change in status of the particular tuner from the idle mode to an active mode and discontinuing recording of the at least one television channel in response to determining the change in status. Here it is contemplated that the particular tuner may in some instances still be considered a non-utilized resource so that when, for example, the television receiver receives a command to tune to "live" programming (or a recording timer fires, etc.), the particular tuner may be reallocated to serve the live programming as desired or requested. In this example, the particular tuner is reallocated to be used in a traditional or conventional or typical sense, to serve content upon command. The television receiver may thus change status of the particular tuner from "idle" to "active" accordingly to one example implementation of the present disclosure.

The methods, systems, devices, computer program products, etc., of the present disclosure may also be configured and/or arranged to or for recording multiple television channels of the plurality of television channels using the particular tuner while the particular tuner is designated as in the idle mode. In some instances, the particular tuner while tuned to a particular may actually be served a swath of bandwidth that contains multiple channels. Here, instead of recording one particular channel, each of the multiple channels contained within the swath of bandwidth may be decoded and then pushed or stored to memory for subsequent access as desired.

The methods, systems, devices, computer program products, etc., of the present disclosure may also be configured and/or arranged to or for selecting the at least one television channel based upon a priority scheme that identifies the at least one television channel as preferred over other television channels of the plurality of television channels. Such an implementation may thus use or leverage a priority scheme to select particular television channels that are "most preferred" over others. This may be especially beneficial and/or advantageous in scenarios where the number of available tuners is such that not all of the programming or channels as contained with the above-mentioned listing can be recorded for subsequent access.

The methods, systems, devices, computer program products, etc., of the present disclosure may also be configured and/or arranged to or for populating the listing with one or more television channels different than each of the plurality of television channels with or without user-input designating the one or more television channels as intended for inclusion within the listing. The listing in such an implementation may thus be manually or automatically populated. In some examples though, a "hybrid" approach to populating the listing may be performed in which some of the programming or channels as contained with the above-mentioned listing may be inserted therein based on explicit user-input and some of the programming or channels as contained with the above-mentioned listing may be inserted therein without explicit or direct user-input, instead inserted based on historical usage data for example.

Figure 7:
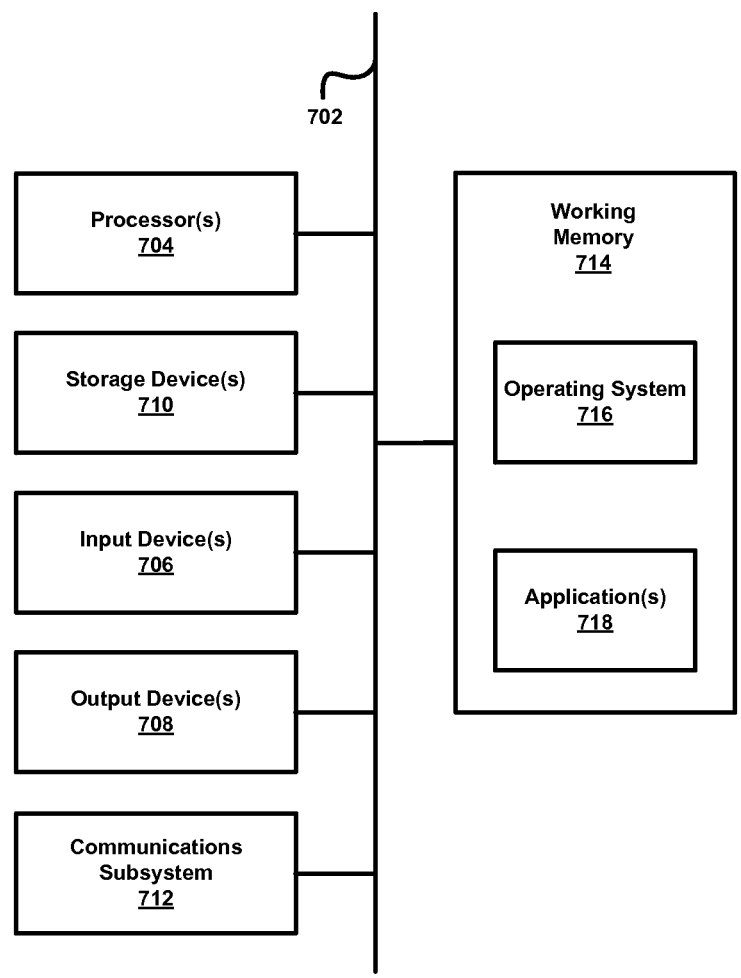
FIG. 7 shows an example computing system or device.

FIG. 7 shows an example computer system or device 700 in accordance with the disclosure. An example of a computer system or device includes an enterprise server, blade server, desktop computer, laptop computer, tablet computer, personal data assistant, smartphone, gaming console, STB, television receiver, and/or any other type of machine configured for performing calculations. Any particular one of the previously-described computing devices may be wholly or at least partially configured to exhibit features similar to the computer system 700, such as any of the respective elements of at least FIG. 2. In this manner, any of one or more of the respective elements of at least FIG. 2 may be configured to perform and/or include instructions that, when executed, perform the method of FIG. 1. Still further, any of one or more of the respective elements of at least FIG. 1 may be configured to perform and/or include instructions that, when executed, instantiate and implement functionality of the PTR 210 and/or the server(s) 218.

The computer device 700 is shown comprising hardware elements that may be electrically coupled via a bus 702 (or may otherwise be in communication, as appropriate). The hardware elements may include a processing unit with one or more processors 704, including without limitation one or more general-purpose processors and/or one or more special-purpose processors (such as digital signal processing chips, graphics acceleration processors, and/or the like); one or more input devices 706, which may include without limitation a remote control, a mouse, a keyboard, and/or the like; and one or more output devices 708, which may include without limitation a presentation device (e.g., television), a printer, and/or the like.

The computer system 700 may further include (and/or be in communication with) one or more non-transitory storage devices 710, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 700 might also include a communications subsystem 712, which may include without limitation a modem, a network card (wireless and/or wired), an infrared communication device, a wireless communication device and/or a chipset such as a Bluetooth™ device, 702.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 712 may permit data to be exchanged with a network (such as the network described below, to name one example), other computer systems, and/or any other devices described herein. In many examples, the computer system 700 will further comprise a working memory 714, which may include a random access memory and/or a read-only memory device, as described above.

The computer device 700 also may comprise software elements, shown as being currently located within the working memory 714, including an operating system 716, device drivers, executable libraries, and/or other code, such as one or more application programs 718, which may comprise computer programs provided by various examples, and/or may be designed to implement methods, and/or configure systems, provided by other examples, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 710 described above. In some cases, the storage medium might be incorporated within a computer system, such as computer system 700. In other examples, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed. As mentioned above, in one aspect, some examples may employ a computer system (such as the computer device 700) to perform methods in accordance with various examples of the disclosure. According to a set of examples, some or all of the procedures of such methods are performed by the computer system 700 in response to processor 704 executing one or more sequences of one or more instructions (which might be incorporated into the operating system 716 and/or other code, such as an application program 718) contained in the working memory 714. Such instructions may be read into the working memory 714 from another computer-readable medium, such as one or more of the storage device(s) 710. Merely by way of example, execution of the sequences of instructions contained in the working memory 714 may cause the processor(s) 704 to perform one or more procedures of the methods described herein.

The terms "machine-readable medium" and/or "computer-readable medium" may refer to any non-transitory medium that participates in providing data that causes a machine to operate in a specific fashion. In an embodiment implemented using the computer device 700, various computer-readable media might be involved in providing instructions/code to processor(s) 704 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 710. Volatile media may include, without limitation, dynamic memory, such as working memory 714.

Example forms of physical and/or tangible computer-readable media may include a floppy disk, a flexible disk, hard disk, magnetic tape, or any other magnetic medium, a compact disc, any other optical medium, ROM (Read Only Memory), RAM (Random Access Memory), and etc., any other memory chip or cartridge, or any other medium from which a computer may read instructions and/or code. Various forms of computer-readable media may be involved in carrying one or more sequences of one or more instructions to the processor(s) 704 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 712 (and/or components thereof) generally will receive signals, and the bus 702 then might carry the signals (and/or the data, instructions, etc. carried by the signals) to the working memory 714, from which the processor(s) 704 retrieves and executes the instructions. The instructions received by the working memory 714 may optionally be stored on a non-transitory storage device 710 either before or after execution by the processor(s) 704.

It should further be understood that the components of computer device 700 can be distributed across a network. For example, some processing may be performed in one location using a first processor while other processing may be performed by another processor remote from the first processor. Other components of computer system 700 may be similarly distributed. As such, computer device 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:

generating, by a multi-tuner television receiver, a first output signal corresponding to an electronic programming guide, wherein the electronic programming guide includes a first menu item for configuring a content provisioning service for recording one or more television channels using one or more idle mode tuners of the television receiver, and wherein the content provisioning service allows for automatic and manual priority ranking of television channels;

ranking a plurality of television channels according to recording priority, wherein a recording priority identifies an order of preference for recording a television channel for an indeterminate time period while a tuner of the television receiver is designated as in an idle mode, wherein ranking includes generating a listing that itemizes the plurality of television channels, wherein ranking includes determining that output usage time for one or more television channels is equal to or exceeds a predetermined and configurable threshold time period, wherein ranking includes identifying portions of total usage time for one or more television channels and populating the listing with the one or more television channels ranked according to the portions of total usage time, wherein ranking includes receiving input corresponding to a manual determination of recording priority, wherein an indeterminate time period corresponds to a time period that does not have an end time explicitly defined, and wherein tuners designated as in the idle mode correspond to tuners unused for actively providing access to live programming or actively recording broadcast programming according to a recording timer;

designating a number of particular tuners of the multi-tuner television receiver to be in the idle mode, wherein the number of particular tuners is less than a total number of tuners of the multi-tuner television receiver;

accessing the listing that itemizes the plurality of television channels;

identifying a first particular television channel from the listing, wherein the first particular television channel corresponds to a first television channel of the plurality of television channels ranked higher than a threshold ranking;

tuning a first particular tuner of the number of particular tuners to the first particular television channel, wherein the first particular tuner is a single particular tuner capable of simultaneously tuning multiple television channels;

recording the first particular television channel while the first particular tuner is designated as in the idle mode, wherein recording the first particular television channel includes simultaneously recording multiple channels of the plurality of television channels including the first particular television channel using the first particular tuner while the first particular tuner is designated as in the idle mode;

outputting, for display within the electronic programming guide, a second menu item that, when selected, activates the television receiver to playback the recording of the first particular television channel;

receiving input corresponding to selection of the second menu item;

generating a second output signal corresponding to playback of the recording of the first particular television channel;

identifying a second particular television channel from the listing, wherein the second particular television channel corresponds to a second television channel of the plurality of television channels ranked higher than the threshold ranking;

tuning a second particular tuner of the number of particular tuners to the second particular television channel;

recording the second particular television channel while the second particular tuner is designated as in the idle mode; and determining a change in status of the first particular tuner from the idle mode to an active mode, wherein determining includes receiving a command to tune the first particular tuner to live programming or to activate a recording timer using the first particular tuner, wherein tuners designated as in the active mode correspond to tuners used for actively providing access to live programming or actively recording programming according to a recording timer;

discontinuing recording of the first particular television channel in response to determining the change in status.

2. The method of claim 1, wherein identifying the first particular television channel includes selecting the first particular television channel based upon a priority scheme that identifies the first particular television channel as preferred by an end-user over other television channels of the plurality of television channels.

3. The method of claim 1, wherein ranking includes populating the listing with one or more television channels without user-input designating the one or more television channels as intended for inclusion within the listing.

4. The method of claim 1, wherein ranking includes populating the listing with one or more television channels ranked based on user-input designating the one or more television channels as intended for inclusion within the listing.

5. The method of claim 1, wherein ranking includes populating the listing with one or more television channels ranked based upon empirical usage activity obtained on a continuously rolling basis by the television receiver during a predetermined and configurable time period.

6. The method of claim 1, wherein ranking includes itemizing a plurality of channels favored by a particular end-user, wherein the listing includes a first television channel manually populated according to end-user input and a second television channel automatically populated without end-user input.

7. A television receiver, comprising:
one or more processors;
a plurality of tuners; and
a memory communicatively coupled with and readable by the one or more processors and having stored therein processor-readable instructions that, when executed by the one or more processors, cause the one or more processors to perform operations including:
generating a first output signal corresponding to an electronic programming guide, wherein the electronic programming guide includes a first menu item for configuring a content provisioning service for recording one or more television channels using one or more idle mode tuners of the television receiver, and wherein the content provisioning service allows for automatic and manual priority ranking of television channels;

ranking a plurality of television channels according to recording priority, wherein a recording priority identifies an order of preference for recording a television channel for an indeterminate time period while a tuner of the television receiver is designated as in an idle mode, wherein ranking includes generating a listing that itemizes the plurality of television channels, wherein ranking includes determining that output usage time for one or more television channels is equal to or exceeds a predetermined and configurable threshold time period, wherein ranking includes identifying portions of total usage time for one or more television channels and populating the listing with the one or more television channels ranked according to the portions of total usage time, wherein ranking includes receiving input corresponding to a manual determination of recording priority, wherein an indeterminate time period corresponds to a time period that does not have an end time explicitly defined, and wherein tuners designated as in the idle mode correspond to tuners unused for actively providing access to live programming or actively recording broadcast programming according to a recording timer;

designating a number of particular tuners of the plurality of tuners to be in the idle mode, wherein the number of particular tuners is less than a total number of tuners of the plurality of tuners;

accessing the listing that itemizes the plurality of television channels;

identifying a first particular television channel from the listing, wherein the first particular television channel corresponds to a first television channel of the plurality of television channels ranked higher than a threshold ranking;

tuning the first particular tuner to the first particular television channel, wherein the first particular tuner is a single particular tuner capable of simultaneously tuning multiple television channels;

recording the first particular television channel while the first particular tuner is designated as in the idle mode, wherein recording the first particular television channel includes simultaneously recording multiple television channels of the plurality of television channels including the first particular television channel using the first particular tuner while the first particular tuner is designated as in the idle mode;

outputting, for display within the electronic programming guide, a second menu item that, when selected, activates the television receiver to playback the recording of the first particular television channel;

receiving input corresponding to selection of the second menu item;

generating a second output signal corresponding to playback of the recording of the first particular television channel;

identifying a second particular television channel from the listing, wherein the second particular television channel corresponds to a second television channel of the plurality of television channels ranked higher than the threshold ranking;

tuning the second particular tuner to the second particular television channel;

recording the second particular television channel while the second particular tuner is designated as in the idle mode;

determining a change in status of the first particular tuner from the idle mode to an active mode, wherein determining includes receiving a command to tune the first particular tuner to live programming or to activate a recording timer using the first particular tuner, wherein tuners designated as in the active mode correspond to tuners used for actively providing access to live programming or actively recording programming according to a recording timer; and discontinuing recording of the first particular television channel in response to determining the change in status.

8. The television receiver of claim 7, wherein identifying the first particular television channel includes selecting the first particular television channel based upon a priority scheme that identifies the first particular television channel as preferred by an end-user over other television channels of the plurality of television channels.

9. The television receiver of claim 7, wherein ranking includes populating the listing with one or more television channels without user-input designating the one or more television channels as intended for inclusion within the listing.

10. The television receiver of claim 7, wherein ranking includes populating the listing with one or more television channels based on user-input designating the one or more television channels as intended for inclusion within the listing.

11. The television receiver of claim 7, wherein ranking includes populating the listing with one or more television channels ranked based upon empirical usage activity obtained on a continuously rolling basis by the television receiver during a predetermined and configurable time period.

12. The television receiver of claim 7, wherein ranking includes itemizing a plurality of channels favored by a particular end-user, wherein the listing includes a first television channel manually populated according to end-user input and a second television channel automatically populated without end-user input.

13. A method, comprising:

generating, by a multi-tuner television receiver, a first output signal corresponding to an electronic programming guide, wherein the electronic programming guide includes a first menu item for configuring a content provisioning service for recording one or more television channels using one or more idle mode tuners of the television receiver, and wherein the content provisioning service allows for automatic and manual priority ranking of television channels;

ranking a plurality of television channels according to recording priority, wherein a recording priority identifies an order of preference for recording a television channel for an indeterminate time period while a tuner of the television receiver is designated as in an idle mode, wherein ranking includes generating a listing that itemizes the plurality of television channels, wherein the listing includes a first television channel manually populated according to end-user input and a second television channel automatically populated without end-user input, wherein ranking includes determining that output usage time for one or more television channels is equal to or exceeds a predetermined and configurable threshold time period, wherein ranking includes identifying portions of total usage time for one or more television channels and populating the listing with the one or more television channels ranked according to the portions of total usage time, wherein ranking includes receiving input corresponding to a manual determination of recording priority, wherein an indeterminate time period corresponds to a time period that does not have an end time explicitly defined, and wherein tuners designated as in the idle mode correspond to tuners unused for actively providing access to live programming or actively recording broadcast programming according to a recording timer;

designating a number of particular tuners of the multi-tuner television receiver to be in an idle mode, wherein the number of particular tuners is less than a total number of tuners of the multi-tuner television receiver;

accessing the listing that itemizes the plurality of television channels;

identifying a first particular television channel from the listing, wherein the first particular television channel corresponds to a first television channel of the plurality of television channels ranked higher than a threshold ranking, and wherein identifying includes selecting the first particular television channel based upon a priority scheme that identifies the first particular television channel as preferred by an end-user over other television channels of the plurality of television channels;

recording the first particular television channel using a first particular tuner of the multi-tuner television receiver, wherein the first particular tuner is a single particular tuner capable of simultaneously tuning multiple television channels, and wherein recording the first particular television channel includes simultaneously recording multiple television channels of the plurality of television channels including the first particular television channel using the first particular tuner while the first particular tuner is designated as in the idle mode;

outputting, for display within an electronic programming guide, an icon that, when selected, activates the television receiver to playback the recording of the first particular television channel;

receiving input corresponding to selection of the icon;

generating an output signal corresponding to playback of the recording of the first particular television channel;

identifying a second particular television channel from the listing, wherein the second particular television channel corresponds to a second television channel of the plurality of television channels ranked higher than the threshold ranking;

recording the second particular television channel using a second particular tuner of the multi-tuner television receiver;

determining a change in status of the first particular tuner from the idle mode to an active mode, wherein tuners designated as in the active mode correspond to tuners used for actively providing access to live programming or actively recording programming according to a recording timer; and discontinuing recording of the first particular television channel in response to determining the change in status.

14. The method of claim 13, wherein automatically populating the list with the second television channel without end-user input includes monitoring usage data and determining that the second television channel is tuned to, by an end-user, more frequently than other television channels.

15. The method of claim 13, wherein ranking includes populating the listing with one or more television channels ranked based upon empirical usage activity obtained on a continuously rolling basis by the television receiver during a predetermined and configurable time period.

16. The method of claim 13, wherein identifying the first particular television channel includes selecting the first particular television channel based upon a priority scheme that identifies the first particular television channel as preferred by an end-user over other television channels of the plurality of television channels.

17. The method of claim 13, wherein ranking includes populating the listing with one or more television channels based on user-input designating the one or more television channels as intended for inclusion within the listing.

18. The method of claim 13, wherein ranking includes populating the listing with one or more television channels without user-input designating the one or more television channels as intended for inclusion within the listing.

19. The method of claim 13, wherein ranking includes populating the listing with one or more television channels based on user-input designating the one or more television channels as intended for inclusion within the listing.

20. The method of claim 13, wherein ranking includes itemizing a plurality of channels favored by a particular end-user, wherein the listing includes a first television channel manually populated according to end-user input and a second television channel automatically populated without end-user input.

* * * * *